United States Patent
Takahashi et al.

(10) Patent No.: US 12,474,457 B2
(45) Date of Patent: Nov. 18, 2025

(54) TARGET DISTANCE ESTIMATION DEVICE, RADIO WAVE DETECTION DEVICE, AND TARGET DISTANCE ESTIMATION METHOD

(71) Applicant: Mitsubishi Electric Corporation, Tokyo (JP)

(72) Inventors: Yoshiki Takahashi, Tokyo (JP); Ryuhei Takahashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 335 days.

(21) Appl. No.: 18/192,565

(22) Filed: Mar. 29, 2023

(65) Prior Publication Data

US 2023/0236300 A1    Jul. 27, 2023

Related U.S. Application Data

(63) Continuation of application No. PCT/JP2020/042645, filed on Nov. 16, 2020.

(51) Int. Cl.
*G01S 11/06* (2006.01)
*G01S 11/02* (2010.01)

(52) U.S. Cl.
CPC .............. *G01S 11/06* (2013.01); *G01S 11/026* (2013.01)

(58) Field of Classification Search
CPC .............................. G01S 11/06; G01S 11/026
USPC .......................................... 342/458, 375, 451
See application file for complete search history.

(56) References Cited

U.S. PATENT DOCUMENTS

| | | | | |
|---|---|---|---|---|
| 6,639,553 B2 * | 10/2003 | Lin | ........................... | G01S 5/04 |
| | | | | 342/458 |
| 7,642,963 B2 * | 1/2010 | Apostolos | ................. | G01S 5/04 |
| | | | | 342/375 |
| 2020/0182919 A1 * | 6/2020 | Yamada | ................... | G01S 7/021 |

FOREIGN PATENT DOCUMENTS

| CN | 104330803 A | 2/2015 |
|---|---|---|
| JP | 6400251 B1 | 10/2018 |

OTHER PUBLICATIONS

Adamy, "A First Course in Electronic Warfare", Tokyo Denki University Press, 2013, pp. 76-79, total 5 pages.

(Continued)

*Primary Examiner* — Bo Fan
(74) *Attorney, Agent, or Firm* — Birch, Stewart, Kolasch & Birch, LLP

(57) ABSTRACT

A target distance estimation device includes: a multipath composite wave signal generation unit that generates a multipath composite wave signal that is a simulation signal of a composite wave of a direct wave and a multipath wave received by a reception antenna in a case where a provisional target distance, which is a provisional target distance from a radio source to a radio wave detection device, is set; and a target distance estimation unit that estimates a target distance from the radio wave detection device to the radio source on the basis of a correlation between the reception signals and the multipath composite wave signal generated by the multipath composite wave signal generation unit.

15 Claims, 11 Drawing Sheets

(56) References Cited

OTHER PUBLICATIONS

Ito et al., "Experimental Result of Passive Bistatic Radar with Unknown Transmitting Radar Pulse", Proceedings of the 10th European Radar Conference, Nuremberg, Germany, Oct. 9-11, 2013, pp. 455-458.
Takahashi et al., "Altitude Estimation of Low Elevation Target over the Sea for Surface Based Phased Array Radar", 2010 IEEE Radar Conference, 2010, pp. 123-128.

* cited by examiner

TARGET DISTANCE ESTIMATION DEVICE, RADIO WAVE DETECTION DEVICE, AND TARGET DISTANCE ESTIMATION METHOD

CROSS REFERENCE TO RELATED APPLICATION

This application is a Continuation of PCT International Application No. PCT/JP2020/042645, filed on Nov. 16, 2020, which is hereby expressly incorporated by reference into the present application.

TECHNICAL FIELD

The present disclosure relates to a target distance estimation device for a radio wave detection device.

BACKGROUND ART

A radio wave detection device is a device intended to detect the presence of a radio source or to perform classification or identification of the radio source by analyzing a reception signal (see, for example, Non-Patent Literature 1). Meanwhile, in general, since the radio wave detection device does not have a function of transmitting a radio wave by itself, it is not possible to estimate the distance to a target from a delay time difference between a transmission signal transmitted to the target and a reception signal obtained by receiving a reflected wave from the target, like a radar does.

CITATION LIST

Non-Patent Literature

Non-Patent Literature 1: David Adamy, "Denshisen no Gijyutsu, Kiso Hen (A First Course in Electronic Warfare)", Tokyo Denki University Press

SUMMARY OF INVENTION

Technical Problem

In a free space, it is known that a radio wave has a loss corresponding to a propagation distance (hereinafter, referred to as a propagation loss). Therefore, in order to estimate the distance from a radio wave detection device to a radio source (hereinafter referred to as a target distance), for example, it is conceivable to use a method of calculating the propagation loss of a radio wave transmitted by the radio source from a relationship between the power of a reception signal received by the radio wave detection device and effective radiated power information of the radio source and estimating the target distance from the loss amount of the calculated propagation loss.

However, a radio wave transmitted by a radio source and received by a radio wave detection device includes not only a direct wave propagated on a straight path from the radio source to the radio wave detection device but also multipath waves propagated from the radio source to the radio wave detection device via another path due to reflection or the like. Therefore, there is a problem that an error occurs in the estimated target distance due to fluctuation of the reception power other than the propagation loss.

The present disclosure has been made to solve the above problems, and an object of the present disclosure is to provide technology for improving the estimation accuracy of a target distance from a radio wave detection device to a radio source.

Solution to Problem

A target distance estimation device according to the present disclosure estimates a target distance from a radio wave detection device to a radio source on the basis of reception signals obtained by a reception antenna of the radio wave detection device receiving a direct wave and a multipath wave from the radio source, the target distance estimation device including: processing circuitry to generate a multipath composite wave signal that is a simulation signal of a composite wave of the direct wave and the multipath wave received by the reception antenna in a case where a provisional target distance, which is a provisional target distance from the radio wave detection device to the radio source, is set; and to estimate the target distance from the radio wave detection device to the radio source on a basis of a correlation between the reception signals and the generated multipath composite wave signal.

Advantageous Effects of Invention

According to the present disclosure, it is possible to improve the estimation accuracy of a target distance from a radio wave detection device to a radio source.

DESCRIPTION OF EMBODIMENTS

To describe the present disclosure further in detail, embodiments for carrying out the present disclosure will be described below with reference to the accompanying drawings.

First Embodiment

Figure 1:
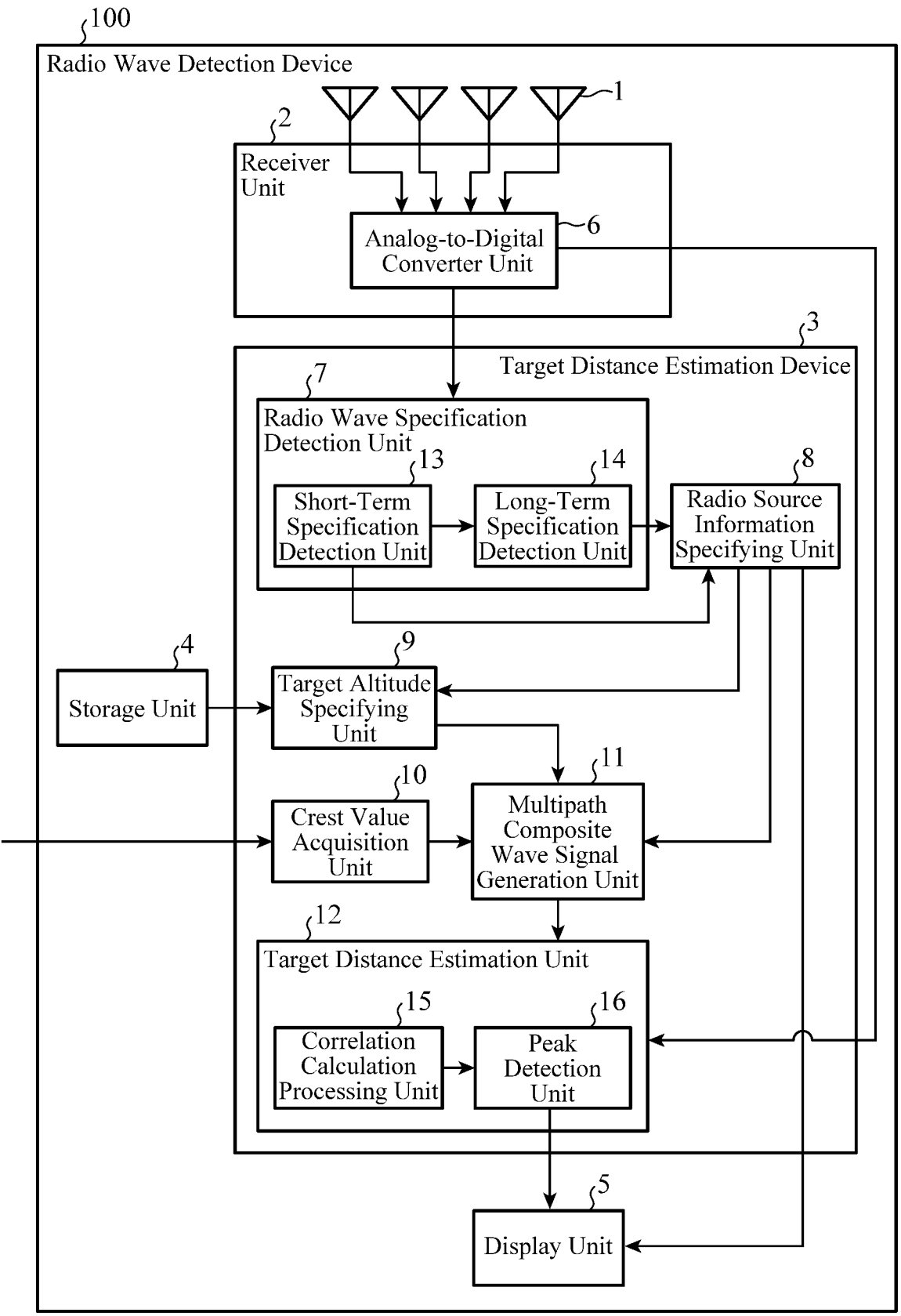
FIG. 1 is a block diagram illustrating a configuration of a radio wave detection device according to a first embodiment.

FIG. 1 is a block diagram illustrating a configuration of a radio wave detection device 100 according to a first embodiment. As illustrated in FIG. 1, the radio wave detection device 100 includes an array antenna 1, a reception unit 2, a target distance estimation device 3, a storage unit 4, and a display unit 5. The target distance estimation device 3 includes a radio wave specification detection unit 7, a radio source information specifying unit 8, a target altitude specifying unit 9, a crest value acquisition unit 10, a multipath composite wave signal generation unit 11, and a target distance estimation unit 12. Note that, in the first embodiment, an example in which the radio wave detection device 100 can acquire the crest value and the altitude of a radio source will be described.

The array antenna 1 (reception antenna) acquires reception signals by receiving a direct wave and multipath waves from a radio source. More specifically, in the first embodiment, the array antenna 1 acquires a reception signal for each antenna element by receiving a direct wave and multipath waves from the radio source by the antenna element. The array antenna 1 outputs the acquired reception signals to the reception unit 2.

Note that, in the first embodiment, a configuration in which the array antenna 1 receives the direct wave and multipath waves from a single radio source will be described. However, for example, the array antenna 1 may acquire reception signals for each of a plurality of radio sources included in a single platform by receiving a direct wave and multipath waves from each of the radio sources.

The reception unit 2 includes an analog-to-digital converter unit 6. The analog-to-digital converter unit 6 converts the reception signals acquired by the array antenna 1 from an analog signal to a digital signal. More specifically, in the first embodiment, the analog-to-digital converter unit 6 converts a reception signal output from each antenna element of the array antenna 1 from an analog signal to a digital signal. The analog-to-digital converter unit 6 outputs the reception signals converted into the digital signals to each of the radio wave specification detection unit 7 and the target distance estimation unit 12 of the target distance estimation device 3.

Note that the reception unit 2 may further include an analog circuit such as an amplifier, a band-pass filter, or a frequency converter in order to improve the reception sensitivity or the like. In that case, the analog-to-digital converter unit 6 converts the reception signals processed by the analog circuit from analog signals to digital signals.

The radio wave specification detection unit 7 detects radio wave specifications (parameters) of reception signals on the basis of the reception signals. More specifically, in the first embodiment, the radio wave specification detection unit 7 detects radio wave specifications of reception signals on the basis of the reception signals converted into digital signals by the analog-to-digital converter unit 6. More specifically, the radio wave specification detection unit 7 detects radio wave specifications on the basis of a reception signal of each antenna element of the array antenna 1. The radio wave specification detection unit 7 outputs the detected radio wave specifications to the radio source information specifying unit 8.

More specifically, in the first embodiment, the radio wave specification detection unit 7 includes a short-term specification detection unit 13 and a long-term specification detection unit 14. The short-term specification detection unit 13 determines the presence or absence of a reception signal from the radio source from the digital data of each antenna element (for each channel) that has been converted into a digital signal by the analog-to-digital converter unit 6 and extracts information of the reception signals that can be extracted even from digital data of a relatively short observation time (several microseconds to several milliseconds) (for example, a frequency, a bandwidth, a pulse width, an amplitude, a modulation method, or the like) as radio wave specifications. The short-term specification detection unit 13 outputs the extracted radio wave specifications to each of the long-term specification detection unit 14 and the radio source information specifying unit 8. The long-term specification detection unit 14 accumulates the radio wave specifications extracted by the short-term specification detection unit 13 for a relatively long period of time (several milliseconds to several seconds, or several minutes) and extracts further information (for example, a pulse repetition period, a scan period, the number of staggered positions, and a jitter width) of the reception signals as radio wave specifications. The long-term specification detection unit 14 outputs the extracted radio wave specifications to the radio source information specifying unit 8. Note that as the processing performed by the long-term specification detection unit 14, for example, a method described in a patent document such as Japanese Patent No. 6400251 may be used.

The radio source information specifying unit 8 (classification and identification processing unit) specifies radio source information related to the radio source on the basis of the radio wave specifications detected by the radio wave specification detection unit 7. The radio source information specifying unit 8 outputs the specified radio source information to each of the target altitude specifying unit 9, the multipath composite wave signal generation unit 11, and the display unit 5. Examples of the radio source information related to the radio source specified by the radio source information specifying unit 8 include a radar name, a communication device name, the type of a mounting platform (an aircraft, a ship, or the like), effective radiated power of the radio source, and others.

More specifically, in the first embodiment, the storage unit 4 stores a classification and identification table in which a correspondence relationship between radio source information related to radio sources and radio wave specifications is recorded, and the radio source information specifying unit 8 extracts radio source information by collating the classification and identification table stored in the storage unit 4 with the radio wave specifications output by each of the short-term specification detection unit 13 and the long-term specification detection unit 14.

The target altitude specifying unit 9 specifies a target altitude that is the altitude of the radio source on the basis of the radio source information specified by the radio source information specifying unit 8. The target altitude specifying unit 9 outputs the specified target altitude to the multipath composite wave signal generation unit 11.

More specifically, in the first embodiment, the storage unit 4 stores a radio source altitude database, and the target altitude specifying unit 9 specifies the target altitude that is the altitude of the radio source on the basis of the radio source information specified by the radio source information specifying unit 8 and the radio source altitude database stored in the storage unit 4. The radio source altitude database herein refers to, for example, information in which radio sources and altitudes of the radio sources are associated with each other.

The crest value acquisition unit 10 acquires a crest value. Note that the crest value herein refers to a value of the height of a wave in a sea area where the radio wave detection device 100 is used. The crest value acquisition unit 10 outputs the acquired crest value to the multipath composite wave signal generation unit 11. Examples of crest values acquired by the crest value acquisition unit 10 include values obtained from other sensors (for example, a camera or a wave height meter), values calculated from statistical information of crest values in the sea area where the radio wave detection device 100 is used, and the like.

The multipath composite wave signal generation unit 11 generates a multipath composite wave signal which is a simulation signal of a composite wave of direct waves and multipath waves received by elements (reception antennas) of the array antenna 1 in a case where a provisional target distance which is a provisional target distance from the radio wave detection device 100 (more specifically, the array antenna 1) to the radio source is set. More specifically, in the first embodiment, the multipath composite wave signal generation unit 11 generates the multipath composite wave signal on the basis of the target altitude specified by the target altitude specifying unit 9 and the crest value acquired by the crest value acquisition unit 10. The multipath composite wave signal generation unit 11 outputs the generated multipath composite wave signal to the target distance estimation unit 12.

Note that the multipath composite wave signal generation unit 11 may generate the multipath composite wave signal on the basis of the target altitude specified by the target altitude specifying unit 9, the crest value acquired by the crest value acquisition unit 10, and the radio source information (for example, the effective radiated power of the radio source) specified by the radio source information specifying unit 8. The range of the provisional target distance in the multipath composite wave signal generated by the multipath composite wave signal generation unit 11 may be set from the maximum detection distance presumed by the target distance estimation device 3. In a case where the array antenna 1 (reception antennas) acquires reception signals of each of a plurality of radio sources included in a single platform by receiving a direct wave and multipath waves from each of the radio sources, the multipath composite wave signal generation unit 11 may generate a multipath composite wave signal for each of the radio sources.

The target distance estimation unit 12 estimates a target distance (actual target distance) from the radio wave detection device 100 (more specifically, the array antenna 1) to the radio source on the basis of a correlation between the reception signals and the multipath composite wave signal generated by the multipath composite wave signal generation unit 11. More specifically, the target distance estimation unit 12 estimates the target distance from the radio wave detection device 100 to the radio source on the basis of the correlation between the reception signals converted into the digital signals by the analog-to-digital converter unit 6 and the multipath composite wave signal generated by the multipath composite wave signal generation unit 11. The target distance estimation unit 12 outputs the estimated target distance to the display unit 5.

More specifically, in the first embodiment, the target distance estimation unit 12 includes a correlation calculation processing unit 15 and a peak detection unit 16. The correlation calculation processing unit 15 calculates a correlation value for each provisional target distance by performing correlation calculation between a reception signal converted into a digital signal by the analog-to-digital converter unit 6 and a multipath composite wave signal generated by the multipath composite wave signal generation unit 11. The correlation calculation processing unit 15 outputs the calculated correlation values to the peak detection unit 16. The peak detection unit 16 extracts, as a target distance, a provisional target distance corresponding to the largest correlation value among the correlation values calculated by the correlation calculation processing unit 15.

Note that the target distance estimation unit 12 may accumulate estimated target distances and smooth the plurality of accumulated target distances using a filter. In a case where the array antenna 1 (reception antennas) acquires reception signals of each of a plurality of radio sources included in a single platform by receiving a direct wave and multipath waves from each of the radio sources, the target distance estimation unit 12 may estimate a target distance for each of the radio sources on the basis of a correlation between reception signals for each of the radio sources and a multipath composite wave signal for each of the radio sources generated by the multipath composite wave signal generation unit 11 and calculate an average value of the estimated target distances. As a result, the distance from the radio wave detection device 100 to the platform can be estimated.

In a case where the radio source information specifying unit 8 specifies the effective radiated power of a radio source as radio source information, the target distance estimation unit 12 may calculate an estimated target distance range from the radio wave detection device 100 to the radio source on the basis of the reception power of the reception signals and the effective radiated power specified by the radio source information specifying unit 8. Then, the target distance estimation unit 12 may exclude a target distance outside the calculated estimated target distance range from among the estimated target distances.

The display unit 5 displays the target distances estimated by the target distance estimation unit 12. More specifically, in the first embodiment, the display unit 5 displays the radio source information specified by the radio source information specifying unit 8 and the target distances estimated by the target distance estimation unit 12 in association with each other. Examples of the display unit 5 include a liquid crystal display, a video output device such as an organic EL or a cathode ray tube, and others. Note that the radio wave detection device 100 may not include the display unit 5. The radio wave detection device 100 may include, instead of the display unit 5, a printer that prints the radio source information and the target distance on a sheet of paper.

Figure 2:
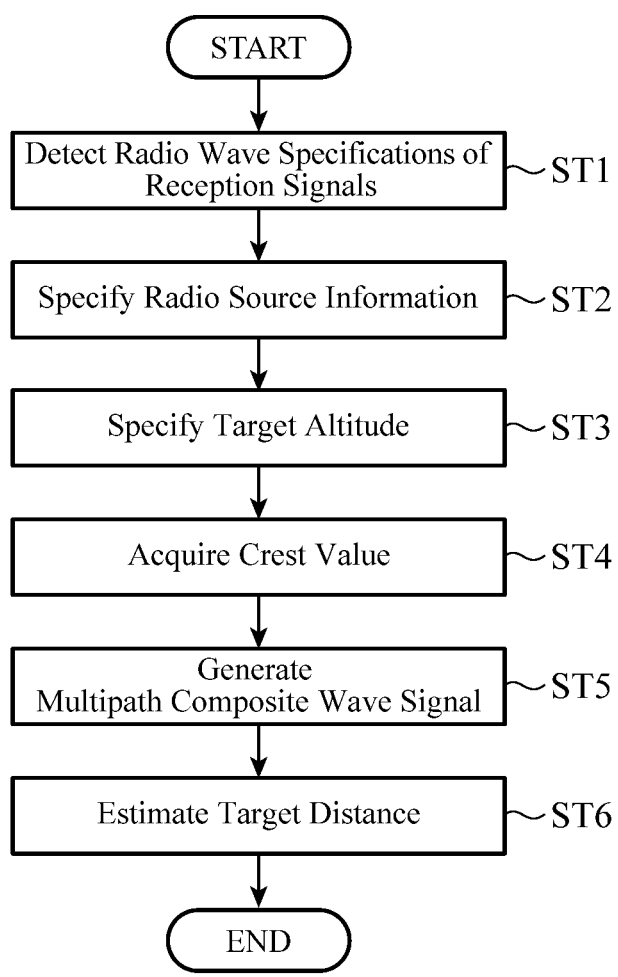
FIG. 2 is a flowchart illustrating a target distance estimation method by a target distance estimation device according to the first embodiment.

Hereinafter, the operation of the target distance estimation device 3 according to the first embodiment will be described with reference to drawings. FIG. 2 is a flowchart illustrating a target distance estimation method by the target distance estimation device 3 according to the first embodiment. Note that it is based on the premise that the analog-to-digital converter unit 6 has converted reception signals acquired by the array antenna 1 from analog signals to digital signals before the following steps are performed.

As illustrated in FIG. 2, the radio wave specification detection unit 7 detects radio wave specifications of the reception signals on the basis of the reception signals converted into the digital signals by the analog-to-digital converter unit 6 (step ST1). The radio wave specification detection unit 7 outputs the detected radio wave specifications to the radio source information specifying unit 8.

Next, the radio source information specifying unit 8 specifies radio source information related to a radio source on the basis of the radio wave specifications detected by the radio wave specification detection unit 7 (step ST2). The radio source information specifying unit 8 outputs the specified radio source information to each of the target altitude specifying unit 9 and the display unit 5.

Next, the target altitude specifying unit 9 specifies the target altitude that is the altitude of the radio source on the basis of the radio source information specified by the radio source information specifying unit 8 (step ST3). The target altitude specifying unit 9 outputs the specified target altitude to the multipath composite wave signal generation unit 11.

Next, the crest value acquisition unit 10 acquires a crest value (step ST4). The crest value acquisition unit 10 outputs the acquired crest value to the multipath composite wave signal generation unit 11.

Next, the multipath composite wave signal generation unit 11 generates the ぁ above-described multipath composite wave signal on the basis of the target altitude specified by the target altitude specifying unit 9 and the crest value acquired by the crest value acquisition unit 10 (step ST5). The multipath composite wave signal generation unit 11 outputs the generated multipath composite wave signal to the target distance estimation unit 12.

Next, the target distance estimation unit 12 estimates the target distance from the radio wave detection device 100 to the radio source on the basis of the correlation between the reception signals converted into the digital signals by the analog-to-digital converter unit 6 and the multipath composite wave signal generated by the multipath composite wave signal generation unit 11 (step ST6). The target distance estimation unit 12 outputs the estimated target distance to the display unit 5. The display unit 5 displays the radio source information specified by the radio source information specifying unit 8 and the target distance estimated by the target distance estimation unit 12 in association with each other.

Hereinafter, specific examples of a multipath composite wave signal generating method (step ST5 described above) and the target distance estimation method (step ST6 described above) by the target distance estimation device 3 according to the first embodiment will be described. Incidentally, in the following description, a character bracketed by [ ] indicates a matrix or a vector indicated in bold in the following equations.

Reception signals received by antenna elements of the array antenna 1 including L antenna elements and converted into digital signals by the analog-to-digital converter unit 6 of the reception unit 2 include L× Ns input data vectors [z], in a case where the number of time samples is Ns. The input data vectors [z] are expressed by the following Equation (1).

$$z = A_{r2t} S_{r2t} + A_{r2s} S_{r2s} + N \tag{1}$$

In Equation (1), [N] is a vector representing noise. $[A_{r2t}]$ is expressed by the following Equation (2). $[A_{r2s}]$ is expressed by the following Equation (3). $[S_{r2t}]$ is expressed by the following Equation (4). $[S_{r2s}]$ is expressed by the following Equation (5).

$$A_{r2t} = [a_{r2t}(H_{t,1}, R_1, \sigma_{h,1}) \ a_{r2t}(H_{t,2}, R_2, \sigma_{h,2}) \ a_{r2t}(H_{t,K}, R_K, \sigma_{h,K})] \tag{2}$$

$$A_{r2s} = [a_{r2s}(H_{t,1}, R_1, \sigma_{h,1}) \ a_{r2s}(H_{t,2}, R_2, \sigma_{h,2}) \ a_{r2s}(H_{t,K}, R_K, \sigma_{h,K})] \tag{3}$$

$$S_{r2t} = \begin{bmatrix} s_1(1) & \cdots & s_1(N_s) \\ \vdots & \ddots & \vdots \\ s_K(1) & \cdots & s_K(Ns) \end{bmatrix} \tag{4}$$

$$S_{r2s} = \begin{bmatrix} \rho_1 s_1(1) & \cdots & \rho_1 s_1(N_s) \\ \vdots & \ddots & \vdots \\ \rho_K s_K(1) & \cdots & \rho_K s_K(Ns) \end{bmatrix} \tag{5}$$

In Equations (2), (3), (4), and (5), K represents the number of incoming waves, and $[A_{r2t}]$ is an L×K matrix in which reception array steering vectors $[a_{r2t}]$ of direct waves determined by the altitude $H_t$ (target altitude), the distance R (target distance), and the crest value $\sigma_h$ of a radio source are arranged in a column direction. $[A_{r2s}]$ is an L×K matrix in which reception array steering vectors $[a_{r2s}]$ of multipath waves determined by the altitude $H_t$ (target altitude), the distance R (target distance), and the crest value $\sigma_h$ of a radio source are arranged in the column direction. $[S_{r2t}]$ is a matrix indicating a complex amplitude of a direct wave having s as a component (k is a positive integer). $[S_{r2s}]$ is a matrix indicating a complex amplitude of a multipath wave having ρ× s as a component. ρ is a sea-surface reflection coefficient and is expressed by the following Equation (6).

$$\rho = |\Gamma| \rho_s D \tag{6}$$

In Equation (6), $|\Gamma|$ represents a Fresnel reflection coefficient. $\rho_s$ represents a specular reflection coefficient. D indicates a divergence factor. In a case of vertically polarized waves, the Fresnel reflection coefficient $\Gamma$ is expressed by Equation (7).

$$\Gamma = \frac{\epsilon_c \sin\psi - \sqrt{\epsilon_c - \cos^2\psi}}{\epsilon_c \sin\psi + \sqrt{\epsilon_c - \cos^2-\psi}} \tag{7}$$

In Equation (7), $\Psi$ represents a grazing angle. $\epsilon_c$ is a complex dielectric constant and is expressed by the following Equation (8).

$$\epsilon_c = \epsilon_r - j\epsilon_i \tag{8}$$

In Equation (8), $\epsilon_r$ is expressed by the following Equation (9). $\epsilon_i$ is expressed by the following Equation (10).

$$\epsilon_r = \frac{\epsilon_s - \epsilon_0}{1 + (2\pi f \tau)^2} + \epsilon_0 \tag{9}$$

$$\epsilon_i = \frac{2\pi f \tau (\epsilon_s - \epsilon_0)}{1 + (2\pi f \tau)} + \frac{2\sigma_i}{f} \tag{10}$$

In Equation (9) and Equation (10), $\epsilon_s$ represents a dielectric constant. τ represents an attenuation coefficient. $\sigma_i$ represents ionic conductivity. f represents a frequency. Incidentally, $\epsilon_0 = 4.9$.

Meanwhile, the Specular reflection coefficient $\rho_s$ is expressed by the following Equation (11).

$$\rho_s = \exp\left(-2\left(\frac{2\pi f \sigma_h \sin\psi}{c}\right)^2\right) \tag{11}$$

In Equation (11), c represents the speed of light, and σn represents the standard deviation of the crest value (hereinafter simply referred to as the crest value).

The above-described divergence factor D is expressed by the following Equation (12).

$$D = \left(1 + \frac{2G_a G_b}{R_e G \sin \psi}\right)^{-0.5} \quad (12)$$

In Equation (12), $G_a$ represents a ground range from the device to a sea-surface reflection point. $G_b$ indicates a ground range from the sea-surface reflection point to the target. $R_e$ represents an effective radius of the earth The grazing angle $\Psi$ is expressed by the following Equation (13).

$$\psi = \sin^{-1}\left(\frac{2R_e H_\tau + H_\tau^2 - R_a^2}{2R_e R_a}\right) \quad (13)$$

In Equation (13), $H_r$ represents the altitude of the device. $R_a$ is expressed by the following Equation (14).

$$R_a = \sqrt{R_e^2 + (R_e + H_r)^2 - 2R_e(R_e + H_r)\cos\eta_a} \quad (14)$$

In Equation (14), $\eta_a$ is expressed by the following Equation (15).

$$\eta_a = \frac{1}{R_e}\left(\frac{G}{2} - p\sin\frac{q}{3}\right) \quad (15)$$

In Equation (15), G represents a ground range ($G_a + G_b$) between the device and the target. p is expressed by the following Equation (16). q is expressed by the following Equation (17).

$$p = \frac{2}{\sqrt{3}}\sqrt{R_e(H_r + H_t) + \left(\frac{G}{2}\right)^2} \quad (16)$$

$$q = \sin^{-1}\left(\frac{2R_e G(H_t - H_r)}{p^3}\right) \quad (17)$$

A propagation delay time difference Δt of a multipath wave with respect to a direct wave is expressed by the following Equation (18).

$$\Delta t = \frac{R_a + R_b}{c} - \frac{R}{c} \quad (18)$$

In Equation (18), $R_a$ represents a slant range between the device and the sea-surface reflection point. $R_b$ indicates a slant range between the sea-surface reflection point and the target. $R_b$ is expressed by the following Equation (19).

$$R_b = \sqrt{R_e^2 + (R_e + H_t)^2 - 2R_e(R_e + H_t)\cos\eta_b} \quad (19)$$

In Equation (19), $\eta_b$ is expressed by the following Equation (20)

$$\eta_b = \frac{G_b}{R_e} = \frac{G_0 - G_a}{R_e} = \frac{\eta R_e - G_n}{R_e} \quad (20)$$

In Equation (20), η is expressed by the following Equation (21).

$$\eta = \cos^{-1}\left(\frac{(R_e + H_t)^2 + (R_e + H_r)^2 - R^2}{2(R_e + H_t)(R_e + H_r)}\right) \quad (21)$$

Here, for the sake of simplicity, it is based on the premise that there is no noise, and considering a case where the number of incoming waves is one, Equation (1) can be rewritten as follows at time t.

$$z(t) = a_{r2t} s_1(t) + \rho_1 a_{r2s} s_1(t - \Delta t) \quad (22)$$

As described above, since a multipath composite wave signal can be modeled by the equations, in step ST5 described above, the multipath composite wave signal generation unit 11 can generate the multipath composite wave signal as desired on the basis of the target altitude specified by the target altitude specifying unit 9 and the crest value acquired by the crest value acquisition unit 10.

Note that altitude estimation of low elevation radar target (ALERT) is known as a method of estimating the altitude of a target by simulating a signal corresponding to the target altitude, a crest value, and a target distance and performing correlation calculation between the simulated signal and a reception signal (see, for example, e.g., R. Takahashi, K. Hirata, H. Maniwa, "Altitude estimation of low elevation target over the sea for surface based phased array radar," 2010 IEEE Radar Conference, 2010.) The ALERT is a method of estimating a target altitude by fixing a radar ranging result as a target distance, generating a signal for correlation calculation for each crest value and target altitude on the basis of Equations (1) to (21), and performing two-dimensional correlation calculation on a reception signal. Since ALERT is a method for a radar reflected wave, information of the target distance can be used.

On the other hand, the radio wave detection device 100 according to the first embodiment that receives a radio wave transmitted from a radio source is a device for analyzing the received radio wave, and information of the target distance is unknown parameters, and thus the information of the target distance cannot be used. However, the radio wave detection device 100 according to the first embodiment can obtain radio source information which is information of the radio source in the process of the reception signal analysis. Specifically, in step ST2 described above, the radio source information specifying unit 8 specifies, for example, a radar name, a communication device name, information of a mounting platform (an aircraft, a ship, or the like), or the like as the radio source information on the basis of the radio wave specifications detected by the radio wave specification detection unit 7. For example, if the mounting platform information becomes clear by the radio source information, the information of the target altitude can be acquired. In addition, in the first embodiment, since the crest value acquisition unit 10 acquires the crest value in step ST4 described above, information of the crest value can be used. Therefore, in step ST6 described above, the target distance estimation unit 12 can estimate the target distance by the correlation calculation (one-dimensional correlation calculation of the provisional target distance) between the multipath composite wave signal generated by the multipath composite wave signal generation unit 11 on the basis of the models of Equations (1) to (20) described in the above step ST5 and the reception signal.

A calculation formula of the correlation calculation performed by the target distance estimation unit 12 in the specific example is expressed by the following Equation (23).

$$P(R, H_t, \sigma_h) = \frac{w(R, H_t, \sigma_h)^H R_{XX} w(R, H_t, \sigma_h)}{w(R, H_t, \sigma_h)^H w(R, H_t, \sigma_h)} \quad (23)$$

In Equation (23), [w (R, $H_t$, $\sigma_h$)] is a multipath composite wave signal simulated by the multipath composite wave signal generation unit 11 on the basis of Equations (1) to (21). Note that, in the first embodiment, the target altitude $H_t$ and the crest value $\sigma_h$ are known, and thus the correlation calculation of Equation (23) is one-dimensional correlation calculation of a provisional target distance R. [$R_{xx}$] is expressed by the following Equation (24).

$$R_{xx} = \frac{1}{N_s} \sum_{n=1}^{N_s} x(t_n) x(t_n)^H \quad (24)$$

In Equation (24), [x ($t_n$)] is a vector indicating a reception signal. $t_n$ indicates the number of pulse hits (n is a positive integer).

The target distance estimation unit 12 extracts, as the target distance, a provisional target distance corresponding to the largest correlation value among correlation values P (R, $H_t$, $\sigma_h$) for each provisional target distance R indicated by Equation (23).

Figure 3:
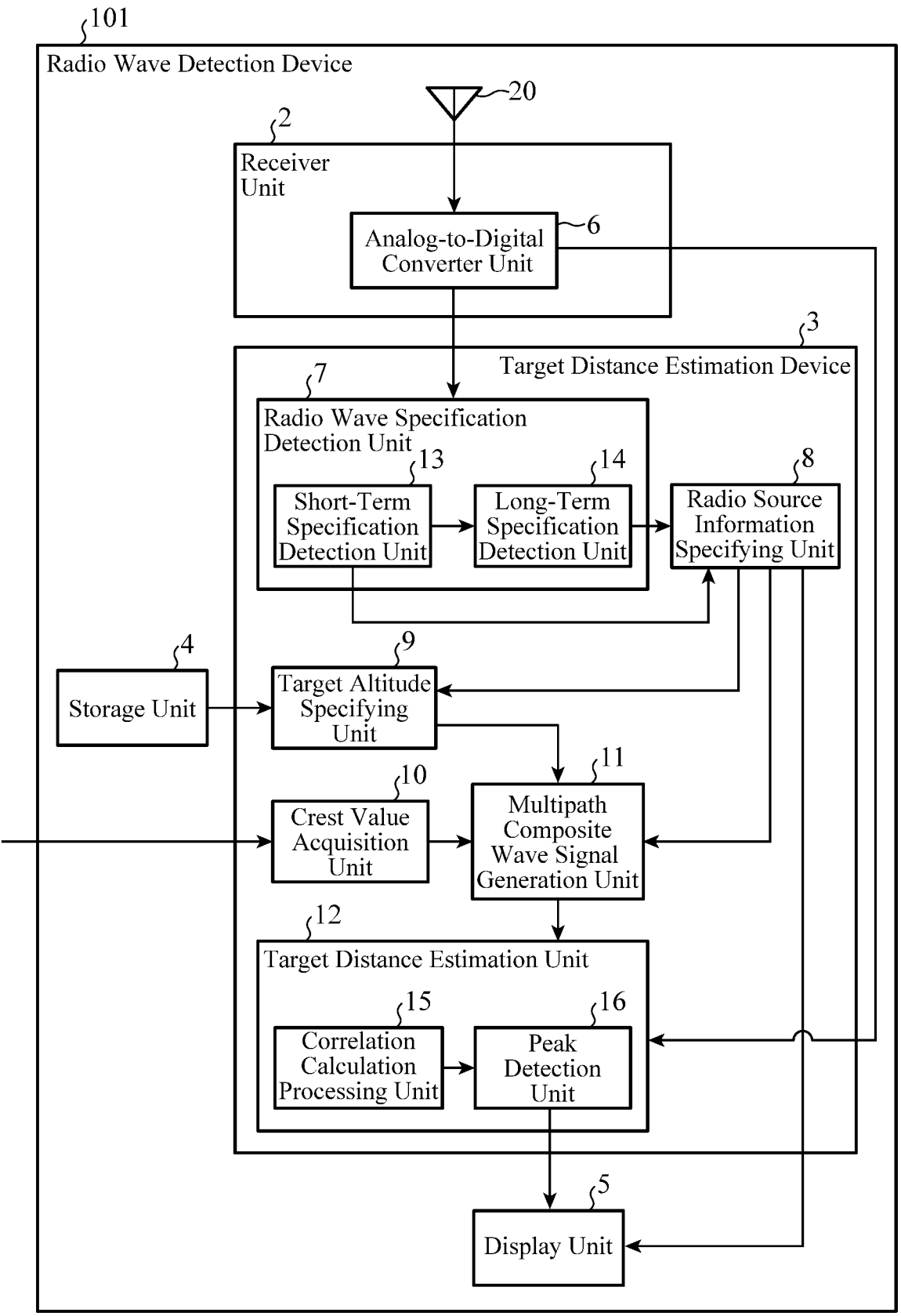
FIG. 3 is a block diagram illustrating a configuration of a radio wave detection device according to a modification of the first embodiment.

Hereinafter, a modification of the radio wave detection device 100 according to the first embodiment will be described with reference to drawings. FIG. 3 is a block diagram illustrating a configuration of a radio wave detection device 101 according to a modification of the first embodiment. As illustrated in FIG. 3, the radio wave detection device 101 has a similar configuration to that of the radio wave detection device 100 except that a reception antenna 20 is included instead of the array antenna 1.

The reception antenna 20 has only a single channel. The reception antenna 20 is, for example, a single antenna, an array antenna with insufficient synchronization accuracy, or a plurality of antenna elements such as an array antenna that combines the output of elements in an analog manner.

Hereinafter, the operation of a target distance estimation device 3 according to the modification will be described. Equation (23) described above is an equation of correlation calculation based on a premise that an antenna included in the radio wave detection device 100 is the array antenna 1. Therefore, in the modification in which the reception antenna 20 has only a single channel, it is not possible to perform target distance estimation based on Equation (23). Therefore, the target distance estimation device 3 performs the following target distance estimation method.

A reception signal z (t) at time t in the modification is expressed by the following Equation (25).

$$z(t) = s(t) + \rho s(t) \quad (25)$$

In Equation (25), s (t) represents a complex amplitude of an incoming wave at time t. In order to perform distance estimation on the basis of the reception signals received by the reception antenna 20 having a single channel, the target distance estimation unit 12 accumulates data sampled up to an observation period T as expressed by the following Equation (26).

$$z = s(0) + \rho s(\Delta t) \quad (26)$$

In Equation (26), [s (0)] represents a time-series vector of a complex amplitude of the number of samples×1 direct waves. [s ($\Delta t$)] is a time-series data vector of a complex amplitude in which a delay of $\Delta t$ reflects a time difference. [s (0)] can be simulated using radio wave specifications (the frequency, the pulse width, the modulation method, or others) that are analysis results of the reception signals detected by the radio wave specification detection unit 7. Incidentally, $\rho$ and $\Delta t$ are parameters determined by the target distance, the crest value, and the target altitude from Equations (7) to (21). Therefore, the target distance estimation unit 12 can estimate the target distance by performing correlation calculation processing according to the following Equations (27) and (28).

$$P(R, H_t, \sigma_h) = \frac{w(R, H_t, \sigma_h)^H R_{xx} w(R, H_t, \sigma_h)}{w(R, H_t, \sigma_h)^H w(R, H_t, \sigma_h)} \quad (27)$$

$$R_{xx} = zz^H \quad (28)$$

That is, since the target altitude and the crest value are known also in the modification, the target distance estimation unit 12 estimates the target distance by one-dimensional correlation calculation of a provisional target distance.

The functions of the radio wave specification detection unit 7 (the short-term specification detection unit 13 and the long-term specification detection unit 14), the radio source information specifying unit 8, the target altitude specifying unit 9, the crest value acquisition unit 10, the multipath composite wave signal generation unit 11, and the target distance estimation unit 12 (the correlation calculation processing unit 15 and the peak detection unit 16) in the target distance estimation device 3 are implemented by a processing circuitry. That is, the target distance estimation device 3 includes a processing circuitry for executing the processing of the steps illustrated in FIG. 2. The processing circuitry may be dedicated hardware or a central processing unit (CPU) for executing a program stored in a memory.

Figure 4A:
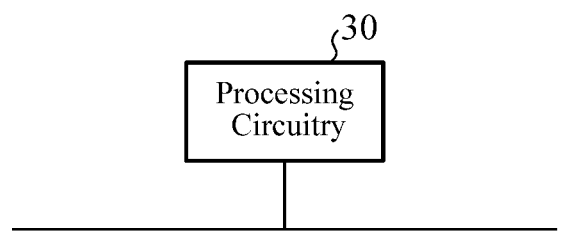
FIG. 4A is a block diagram illustrating a hardware configuration for implementing the functions of the target distance estimation device.
Figure 4B:
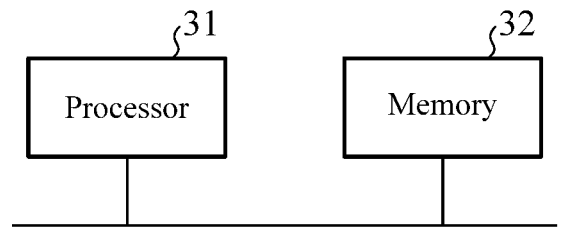
FIG. 4B is a block diagram illustrating a hardware configuration for executing software for implementing the functions of the target distance estimation device.

FIG. 4A is a block diagram illustrating a hardware configuration for implementing the functions of the target distance estimation device 3. FIG. 4B is a block diagram illustrating a hardware configuration for executing software for implementing the functions of the target distance estimation device 3.

In a case where the processing circuitry is a processing circuitry 30 of dedicated hardware illustrated in FIG. 4A, the processing circuitry 30 may be, for example, a single circuit, a composite circuit, a programmed processor, a parallel programmed processor, an application specific integrated circuit (ASIC), a field-programmable gate array (FPGA), or a combination thereof.

The functions of the radio wave specification detection unit 7 (the short-term specification detection unit 13 and the long-term specification detection unit 14), the radio source information specifying unit 8, the target altitude specifying unit 9, the crest value acquisition unit 10, the multipath composite wave signal generation unit 11, and the target distance estimation unit 12 (the correlation calculation processing unit 15 and the peak detection unit 16) in the target distance estimation device 3 may be implemented by separate processing circuitries, or these functions may be collectively implemented by one processing circuitry.

In a case where the processing circuitry is a processor 31 illustrated in FIG. 4B, the functions of the radio wave specification detection unit 7 (the short-term specification detection unit 13 and the long-term specification detection unit 14), the radio source information specifying unit 8, the target altitude specifying unit 9, the crest value acquisition unit 10, the multipath composite wave signal generation unit 11, and the target distance estimation unit 12 (the correlation calculation processing unit 15 and the peak detection unit 16) in the target distance estimation device 3 are implemented by software, firmware, or a combination of software and firmware.

Note that the software or the firmware is described as a program and is stored in a memory 32.

The processor 31 implements the functions of the radio wave specification detection unit 7 (the short-term specification detection unit 13 and the long-term specification detection unit 14), the radio source information specifying unit 8, the target altitude specifying unit 9, the crest value acquisition unit 10, the multipath composite wave signal generation unit 11, and the target distance estimation unit 12 (the correlation calculation processing unit 15 and the peak detection unit 16) in the target distance estimation device 3 by reading and executing a program stored in the memory 32. That is, the target distance estimation device 3 includes the memory 32 for storing programs which result in execution of the processing of the steps illustrated in FIG. 2 when the processor 31 executes these functions.

These programs cause a computer to execute procedures or methods performed by the radio wave specification detection unit 7 (the short-term specification detection unit 13 and the long-term specification detection unit 14), the radio source information specifying unit 8, the target altitude specifying unit 9, the crest value acquisition unit 10, the multipath composite wave signal generation unit 11, and the target distance estimation unit 12 (the correlation calculation processing unit 15 and the peak detection unit 16) in the target distance estimation device 3. The memory 32 may be a computer-readable storage medium storing a program for causing a computer to function as the radio wave specification detection unit 7 (the short-term specification detection unit 13 and the long-term specification detection unit 14), the radio source information specifying unit 8, the target altitude specifying unit 9, the crest value acquisition unit 10, the multipath composite wave signal generation unit 11, and the target distance estimation unit 12 (the correlation calculation processing unit 15 and the peak detection unit 16) in the target distance estimation device 3.

The processor 31 may be, for example, a central processing unit (CPU), a processing device, an arithmetic device, a processor, a microprocessor, a microcomputer, or a digital signal processor (DSP).

The memory 32 may be a nonvolatile or volatile semiconductor memory such as a random access memory (RAM), a read only memory (ROM), a flash memory, an erasable programmable read only memory (EPROM), or an electrically-EPROM (EEPROM), a hard disk, a magnetic disc such as a flexible disc, a flexible disc, an optical disc, a compact disc, a mini disc, a compact disc (CD), a digital versatile disc (DVD), or the like.

Some of the functions of the radio wave specification detection unit 7 (the short-term specification detection unit 13 and the long-term specification detection unit 14), the radio source information specifying unit 8, the target altitude specifying unit 9, the crest value acquisition unit 10, the multipath composite wave signal generation unit 11, and the target distance estimation unit 12 (the correlation calculation processing unit 15 and the peak detection unit 16) in the target distance estimation device 3 may be implemented by dedicated hardware, and some thereof may be implemented by software or firmware.

For example, the functions of the radio wave specification detection unit 7 (the short-term specification detection unit 13 and the long-term specification detection unit 14), the radio source information specifying unit 8, the target altitude specifying unit 9, and the crest value acquisition unit 10 are implemented by a processing circuitry as dedicated hardware. The functions of the multipath composite wave signal generation unit 11 and the target distance estimation unit 12 (the correlation calculation processing unit 15 and the peak detection unit 16) may be implemented by the processor 31 reading and executing a program stored in the memory 32.

In this manner, the processing circuitry can implement the above functions by hardware, software, firmware, or a combination thereof.

As described above, the target distance estimation device 3 according to the first embodiment estimates the target distance from the radio source to the radio wave detection device on the basis of the reception signals obtained by the array antenna 1 (reception antenna) of the radio wave detection device 100 receiving the direct wave and the multipath wave from the radio source, the target distance estimation device 3 including: the multipath composite wave signal generation unit 11 to generate the multipath composite wave signal that is a simulation signal of the composite wave of the direct wave and the multipath wave received by the reception antenna 20 in a case where the provisional target distance, which is the provisional target distance from the radio source to the radio wave detection device 100, is set; and the target distance estimation unit 12 to estimate the target distance from the radio wave detection device 100 to the radio source on the basis of the correlation between the reception signals and the multipath composite wave signal generated by the multipath composite wave signal generation unit 11.

According to the above configuration, by estimating the target distance from the radio wave detection device 100 to the radio source on the basis of the correlation between the reception signals and the multipath composite wave signal that is a simulation signal of the composite wave of the direct wave and the multipath wave, target distance estimation can be performed with consideration to the multipath wave. As a result, it is possible to improve the estimation accuracy of a target distance from the radio wave detection device 100 to a radio source.

The target distance estimation device 3 according to the first embodiment further includes: the radio wave specification detection unit 7 to detect radio wave specifications of the reception signals on the basis of the reception signals; and the radio source information specifying unit 8 to specify radio source information related to the radio source on the basis of the radio wave specifications detected by the radio wave specification detection unit 7.

According to the above configuration, it is possible to specify the radio source that has transmitted the direct wave and the multipath waves received by the reception antenna.

The target distance estimation device 3 according to the first embodiment further includes the target altitude specifying unit 9 to specify the target altitude that is the altitude of the radio source on the basis of the radio source information specified by the radio source information specifying unit 8, in which the multipath composite wave signal generation unit 11 generates the multipath composite wave signal on the basis of the target altitude specified by the target altitude specifying unit 9.

According to the above configuration, since the target altitude is determined with the multipath composite wave signal generated on the basis of the specified target altitude and the target distance estimated on the basis of the correlation between the reception signals and the multipath composite wave signal, it is possible to improve the estimation accuracy of the target distance from the radio wave detection device 100 to the radio source.

The target distance estimation device 3 according to the first embodiment further includes the crest value acquisition unit 10 to acquire a crest value, in which the multipath composite wave signal generation unit 11 generates the multipath composite wave signal on the basis of the crest value acquired by the crest value acquisition unit 10.

According to the above configuration, since the crest value is determined with the multipath composite wave signal generated on the basis of the acquired crest value and the target distance estimated on the basis of the correlation between the reception signals and the multipath composite wave signal, it is possible to improve the estimation accuracy of the target distance from the radio wave detection device 100 to the radio source.

The target distance estimation device 3 according to the first embodiment further includes: the radio wave specification detection unit 7 to detect radio wave specifications of the reception signals on the basis of the reception signals; the radio source information specifying unit 8 to specify radio source information related to the radio source on the basis of the radio wave specifications detected by the radio wave specification detection unit 7; the target altitude specifying unit 9 to specify the target altitude that is the altitude of the radio source on the basis of the radio source information specified by the radio source information specifying unit 8; and the crest value acquisition unit 10 to acquire a crest value, in which the multipath composite wave signal generation unit 11 generates the multipath composite wave signal on the basis of the target altitude specified by the target altitude specifying unit 9 and the crest value acquired by the crest value acquisition unit 10, and the target distance estimation unit 12 calculates a correlation value for each provisional target distance by performing correlation calculation between the reception signals and the multipath composite wave signal generated by the multipath composite wave signal generation unit 11 and extracts, as the target distance, a provisional target distance corresponding to the largest correlation value among the correlation values that have been calculated.

According to the above configuration, the multipath composite wave signal is generated on the basis of the specified target altitude and the acquired crest value, and the correlation calculation between the reception signals and the multipath composite wave signal is performed, thereby calculating a correlation value for each provisional target distance, and a provisional target distance corresponding to the largest correlation value among the calculated correlation values is extracted as the target distance. As a result, the correlation calculation can be performed after the target altitude and the crest value are each determined, and thus it is possible to improve the estimation accuracy of the target distance from the radio wave detection device 100 to the radio source.

The reception antenna in the target distance estimation device 3 according to the first embodiment is the array antenna 1 and acquires reception signals for each antenna element by receiving a direct wave and a multipath wave from the radio source by each antenna element, the radio wave specification detection unit 7 detects radio wave specifications on the basis of reception signals for each antenna element, and the radio source information specifying unit 8 specifies the radio source information on the basis of the radio wave specifications detected by the radio wave specification detection unit 7 on the basis of the reception signals for each antenna element.

According to the above configuration, by detecting the radio wave specifications on the basis of the reception signals of each antenna element and specifying the radio source information, it is possible to improve the specifying accuracy of the radio source.

The target distance estimation unit 12 in the target distance estimation device 3 according to the first embodiment may accumulate the estimated target distances and smooth the plurality of accumulated target distances using a filter.

According to the above configuration, the noise included in the estimated target distance can be removed by smoothing the plurality of accumulated target distances using the filter.

The radio source information specifying unit 8 in the target distance estimation device 3 according to the first embodiment may specify at least the effective radiated power of the radio source as the radio source information on the basis of the radio wave specifications detected by the radio wave specification detection unit 7, and the target distance estimation unit 12 may calculate the estimated target distance range from the radio wave detection device 100 to the radio source on the basis of the reception power of the reception signals and the effective radiated power specified by the radio source information specifying unit 8 and exclude target distances outside the calculated estimated target distance range from the estimated target distances.

According to the above configuration, it is possible to improve the estimation accuracy of the target distance from the radio wave detection device 100 to the radio source by excluding the target distances outside the estimated target distance range.

The array antenna 1 (reception antennas) to receive the reception signals used by the target distance estimation device 3 according to the first embodiment may acquire reception signals of each of a plurality of radio sources included in a single platform by receiving a direct wave and multipath waves from each of the radio sources, the multipath composite wave signal generation unit 11 may generate the multipath composite wave signal for each radio source, and the target distance estimation unit 12 may estimate a target distance for each of the radio sources on the basis of a correlation between reception signals for each of the radio sources and a multipath composite wave signal for each of the radio sources generated by the multipath composite wave signal generation unit 11 and calculate an average value of the estimated target distances.

According to the above configuration, it is possible to estimate the distance from the radio wave detection device 100 to the platform by calculating the average value of the estimated target distances for the respective radio sources.

The radio wave detection device 100 according to the first embodiment includes the target distance estimation device 3 according to the first embodiment, the array antenna 1 (reception antenna), and the display unit 5 that displays the target distances estimated by the target distance estimation unit 12.

According to the above configuration, in the radio wave detection device 100, it is possible to achieve the above-described effects achieved by the target distance estimation device 3 according to the first embodiment.

The target distance estimation method according to the first embodiment is a method of estimating the target distance from the radio wave detection device 100 to a radio source on the basis of the reception signals obtained by the array antenna 1 (reception antenna) of the radio wave detection device 100 receiving the direct wave and the multipath wave from the radio source, the target distance estimation method including: a multipath composite wave signal generating step of generating the multipath composite wave signal that is a simulation signal of the composite wave of the direct wave and the multipath wave received by the array antenna 1 (reception antenna) in a case where the provisional target distance, which is a provisional target distance from the radio wave detection device 100 to the radio source, is set; and a target distance estimating step of estimating the target distance from the radio wave detection device 100 to the radio source on the basis of the correlation between the reception signals and the multipath composite wave signal generated in the multipath composite wave signal generating step.

According to the above configuration, it is possible to achieve effects similar to the above-described effects achieved by the target distance estimation device 3 according to the first embodiment.

Second Embodiment

In the first embodiment, the configuration has been described in which the target distance estimation device 3 includes the crest value acquisition unit 10, and the multipath composite wave signal is generated on the basis of the crest value acquired by the crest value acquisition unit 10 (and the target altitude specified by the target altitude specifying unit 9). In the second embodiment, a configuration in which a target distance estimation device 40 does not include the crest value acquisition unit 10 will be described.

Figure 5:
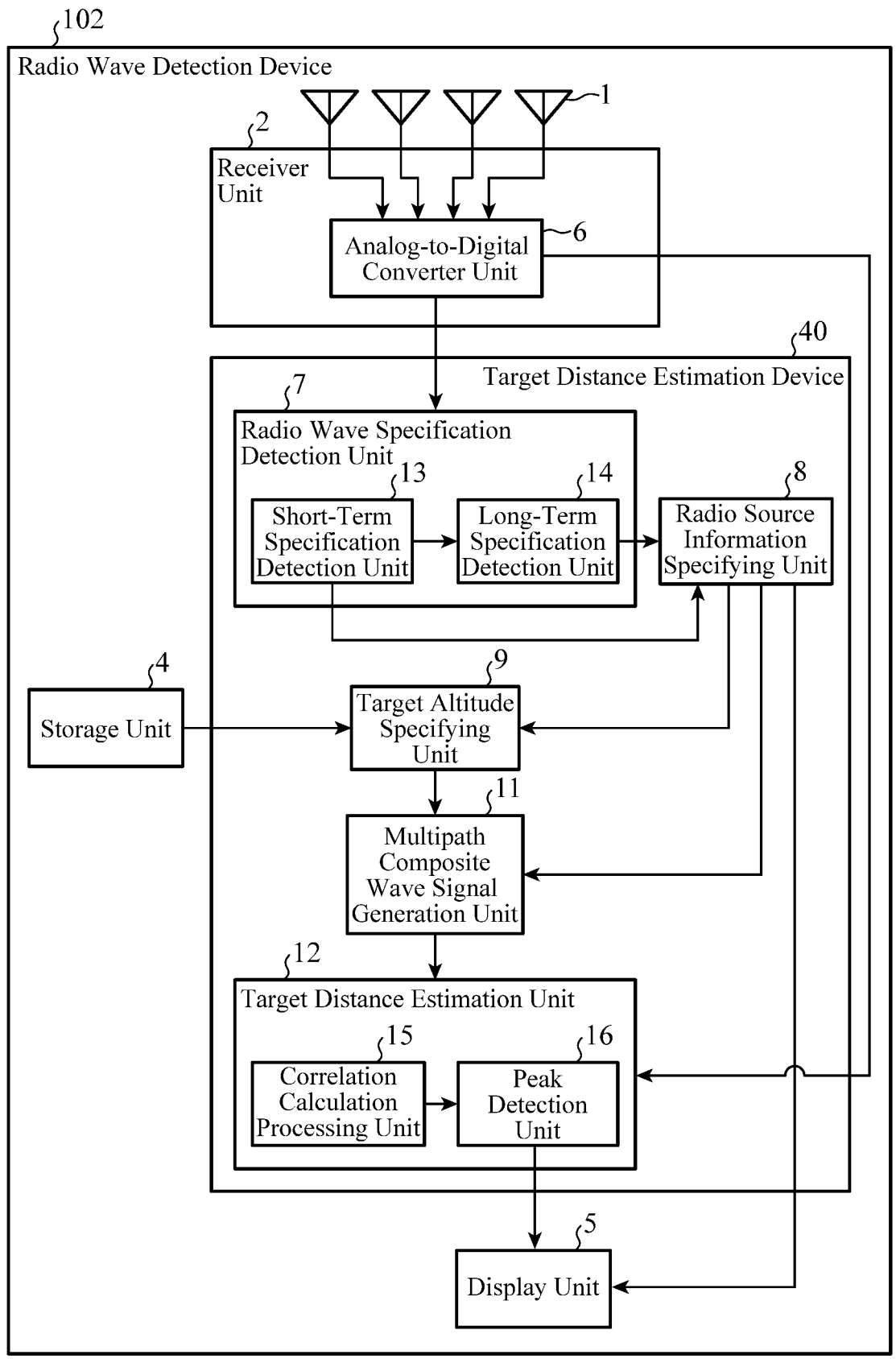
FIG. 5 is a block diagram illustrating a configuration of a radio wave detection device according to a second embodiment.

The second embodiment will be described below with reference to drawings. Note that the same reference numerals are given to components having a similar function as that described in the first embodiment, and description thereof will be omitted. FIG. 5 is a block diagram illustrating a configuration of a radio wave detection device 102 according to the second embodiment. As illustrated in FIG. 5, a target distance estimation device 40 of the radio wave detection device 102 has a similar configuration to that of the target distance estimation device 3 according to the first embodiment except that the crest value acquisition unit 10 is not included.

A multipath composite wave signal generation unit 11 according to the second embodiment generates, in a case where a provisional target distance and a provisional crest value which is a provisional crest value are set, a multipath composite wave signal that is a simulation signal of a composite wave of direct waves and multipath waves received by an array antenna 1 on the basis of a target altitude specified by a target altitude specifying unit 9.

Note that the ranges of the provisional target distance and the provisional crest value in the multipath composite wave signal generated by the multipath composite wave signal generation unit 11 may be set from a crest value presumed by the target distance estimation device 40.

A target distance estimation unit 12 according to the second embodiment calculates a correlation value for each pair of a provisional target distance and a provisional crest value by performing correlation calculation between the reception signals and the multipath composite wave signal generated by the multipath composite wave signal generation unit 11 and extracts a provisional target distance corresponding to the largest correlation value among the calculated correlation values as the target distance.

More specifically, in the second embodiment, a correlation calculation processing unit 15 of the target distance estimation unit 12 performs correlation calculation (two-dimensional correlation calculation between provisional target distances and provisional crest values) between the reception signals converted into digital signals by an analog-to-digital converter unit 6 and the multipath composite wave signal generated by the multipath composite wave signal generation unit 11, thereby calculating a correlation value for each pair of a provisional target distance and a provisional crest value. The peak detection unit 16 of the target distance estimation unit 12 extracts, as a target distance, a provisional target distance corresponding to the largest correlation value among the correlation values calculated by the correlation calculation processing unit 15.

Figure 6:
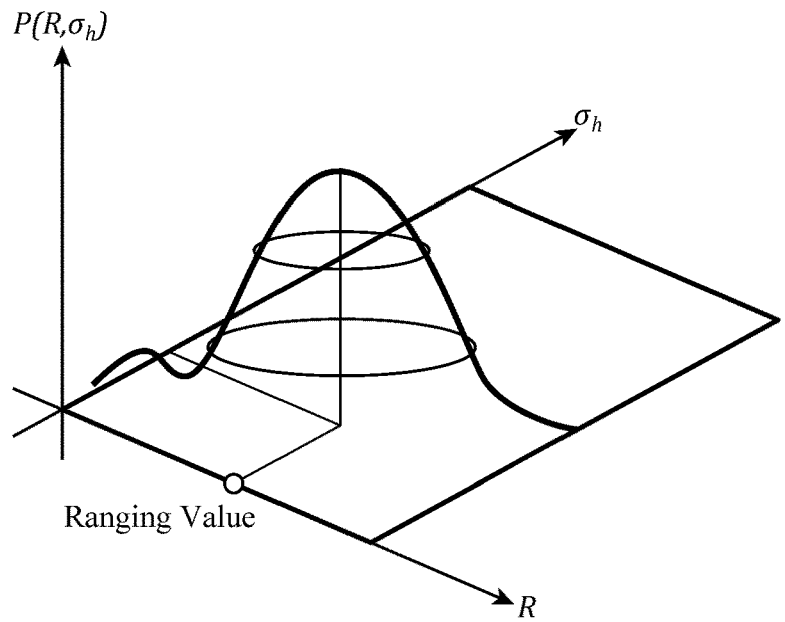
FIG. 6 is a three-dimensional graph for explaining extraction of a target distance by a peak detection unit according to the second embodiment.

FIG. 6 is a three-dimensional graph for explaining extraction of the target distance by the peak detection unit 16. In the example of FIG. 6, the target distance estimation unit 12 extracts, as the target distance (ranging value), a provisional target distance R corresponding to the largest correlation value (peak) among correlation values P (R, $\sigma_h$) for pairs of a provisional target distance R and a provisional crest value $\sigma_h$.

The target distance estimation unit 12 may limit the provisional target distance and the provisional target altitude to be set to be within ranges of provisional target distances and provisional target altitudes with which incident angles of direct waves and multipath waves transmitted, to the array antenna 1, by the radio source, which is presumed to be positioned at the concerned provisional target distance and the provisional target altitude, fall within the coverage of the array antenna 1.

Figure 7:
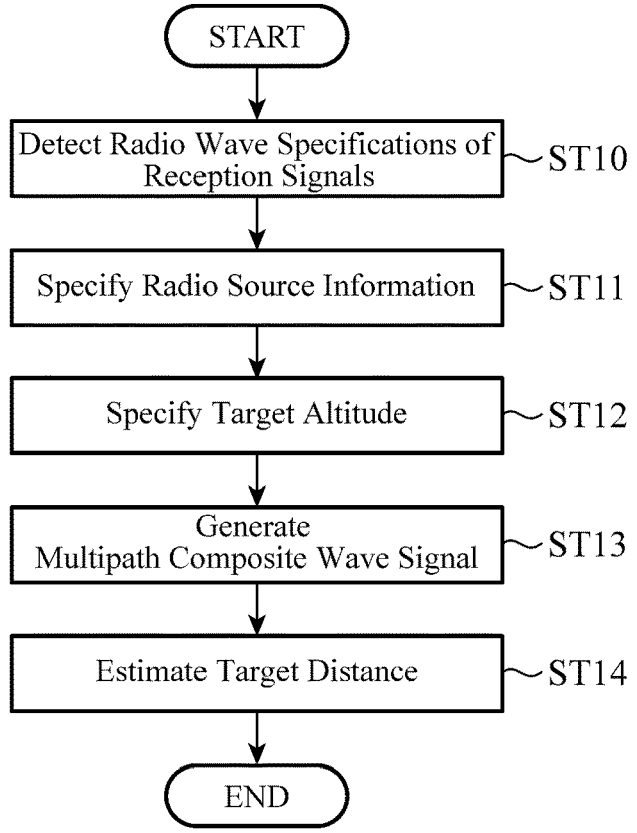
FIG. 7 is a flowchart illustrating a target distance estimation method by a target distance estimation device according to the second embodiment.

Hereinafter, the operation of the target distance estimation device 40 according to the second embodiment will be described with reference to drawings. FIG. 7 is a flowchart illustrating a target distance estimation method by the target distance estimation device 40 according to the second embodiment.

As illustrated in FIG. 7, a radio wave specification detection unit 7 detects radio wave specifications of the reception signals on the basis of the reception signals converted into the digital signals by the analog-to-digital converter unit 6 (step ST10). The radio wave specification detection unit 7 outputs the detected radio wave specifications to the radio source information specifying unit 8.

Next, the radio source information specifying unit 8 specifies radio source information related to a radio source on the basis of the radio wave specifications detected by the radio wave specification detection unit 7 (step ST11). The radio source information specifying unit 8 outputs the specified radio source information to each of the target altitude specifying unit 9 and the display unit 5.

Next, the target altitude specifying unit 9 specifies the target altitude that is the altitude of the radio source on the basis of the radio source information specified by the radio source information specifying unit 8 (step ST12). The target altitude specifying unit 9 outputs the specified target altitude to the multipath composite wave signal generation unit 11.

Next, the multipath composite wave signal generation unit 11 generates the multipath composite wave signal on the basis of the target altitude specified by the target altitude specifying unit 9 (step ST13). The multipath composite wave signal generation unit 11 outputs the generated multipath composite wave signal to the target distance estimation unit 12.

Next, the target distance estimation unit 12 calculates a correlation value for each pair of a provisional target distance and a provisional crest value by performing correlation calculation between the reception signals and the multipath composite wave signal generated by the multipath composite wave signal generation unit 11 and extracts a provisional target distance corresponding to the largest correlation value among the calculated correlation values as the target distance (step ST14). The target distance estimation unit 12 outputs the extracted target distance to the display unit 5. The display unit 5 displays the radio source information specified by the radio source information specifying unit 8 and the target distance extracted by the target distance estimation unit 12 in association with each other.

Note that specific examples of a multipath composite wave signal generating method (step ST13 described above) and a target distance estimation method (step ST14 described above) by the target distance estimation device 40 according to the second embodiment are similar to the specific examples of the multipath composite wave signal generation method and the target distance estimation method by the target distance estimation device 3 according to the first embodiment except that the two-dimensional correlation calculation of provisional crest values and provisional target distances is performed using only the target altitude as a known parameter in the correlation calculation of the above Equation (23).

Figure 8:
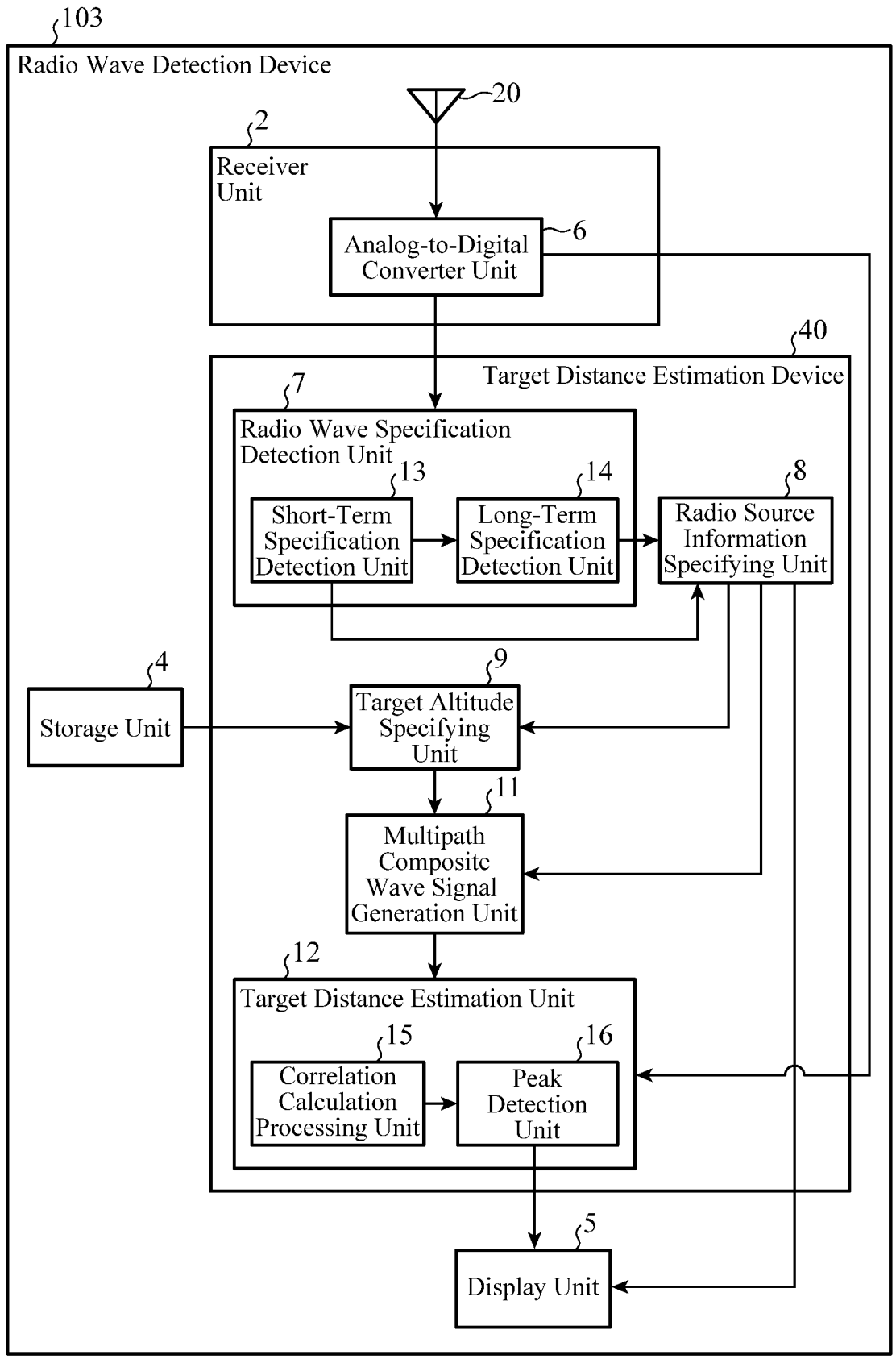
FIG. 8 is a block diagram illustrating a configuration of a radio wave detection device according to a modification of the second embodiment.

Hereinafter, a modification of the radio wave detection device 102 according to the second embodiment will be described with reference to drawings. FIG. 8 is a block diagram illustrating a configuration of the radio wave detection device 103 according to the modification of the second embodiment. As illustrated in FIG. 8, the radio wave detection device 103 has a similar configuration to that of the radio wave detection device 102 except that a reception antenna 20 (already described in the modification of the first embodiment) is included instead of the array antenna 1.

The operation of a target distance estimation device 40 according to the modification is similar to the specific example of the multipath composite wave signal generating method and the target distance estimation method by the target distance estimation device 3 according to the first embodiment except that the target distance estimation unit 12 accumulates data as in the above Equation (26) and performs the two-dimensional correlation calculation of provisional crest values and provisional target distances on the basis of the above Equations (27) and (28).

Note that the functions of the radio wave specification detection unit 7 (the short-term specification detection unit 13 and the long-term specification detection unit 14), the radio source information specifying unit 8, the target altitude specifying unit 9, the multipath composite wave signal generation unit 11, and the target distance estimation unit 12 (the correlation calculation processing unit 15 and the peak detection unit 16) in the target distance estimation device 40 according to the second embodiment are implemented by a processing circuitry. That is, the target distance estimation device 40 according to the second embodiment includes a processing circuitry for executing the processing of the steps illustrated in FIG. 4. The processing circuitry may be dedicated hardware or a central processing unit (CPU) for executing a program stored in a memory. A hardware configuration for implementing the functions of the target distance estimation device 40 according to the second embodiment is similar to the hardware configuration illustrated in FIG. 4A. In addition, a hardware configuration for executing software for implementing the functions of the target distance estimation device 40 according to the second embodiment is similar to the hardware configuration illustrated in FIG. 4B.

As described above, the target distance estimation device 40 according to the second embodiment further includes: the radio wave specification detection unit 7 to detect radio wave specifications of the reception signals on the basis of the reception signals; the radio source information specifying unit 8 to specify radio source information related to the radio source on the basis of the radio wave specifications detected by the radio wave specification detection unit 7; and the target altitude specifying unit 9 to specify a target altitude, which is the altitude of the radio source, on the basis of the radio source information specified by the radio source information specifying unit 8, in which the multipath composite wave signal generation unit 11 generates the multipath composite wave signal that is the simulation signal of the composite wave of the direct wave and the multipath wave received by the array antenna 1 (reception antenna) in a case where a provisional target distance and a provisional crest value, which is a provisional crest value, is set on the basis of the target altitude specified by the target altitude specifying unit 9, and the target distance estimation unit 12 calculates a correlation value for each pair of a provisional target distance and a provisional crest value by performing correlation calculation between the reception signals and the multipath composite wave signal generated by the multipath composite wave signal generation unit 11 and extracts, as the target distance, a provisional target distance corresponding to the largest correlation value among the correlation values that have been calculated.

According to the above configuration, the multipath composite wave signal is generated on the basis of the specified target altitude, and the correlation calculation between the reception signals and the multipath composite wave signal is performed, thereby calculating a correlation value for each pair of a provisional target distance and a provisional crest value, and a provisional target distance corresponding to the largest correlation value among the calculated correlation values is extracted as the target distance. As a result, even in a situation where only the target altitude is determined, the target distance from the radio wave detection device 102 to the radio source can be estimated.

The target distance estimation unit 12 in the target distance estimation device 40 according to the second embodiment may limit the provisional target distance and the provisional target altitude to be set for calculating the correlation values to be within ranges of provisional target distances and provisional target altitudes with which incident angles of direct waves and multipath waves transmitted, to the array antenna 1 (reception antenna), by the radio source, which is presumed to be positioned at the concerned provisional target distance and the provisional target altitude, fall within the coverage of the array antenna 1 (reception antenna).

According to the above configuration, since the ranges of the provisional target distance and the provisional target altitude to be set can be limited, the calculation amount for calculating correlation values can be reduced.

Third Embodiment

In the first embodiment, the configuration has been described in which the target distance estimation device 3 includes the crest value acquisition unit 10 and the target altitude specifying unit 9, and the multipath composite wave signal is generated on the basis of the crest value acquired by the crest value acquisition unit 10 and the target altitude specified by the target altitude specifying unit 9). In the third embodiment, a configuration in which a target distance estimation device 50 includes a target velocity specifying unit instead of the crest value acquisition unit 10 and the target altitude specifying unit 9 will be described.

Figure 9:
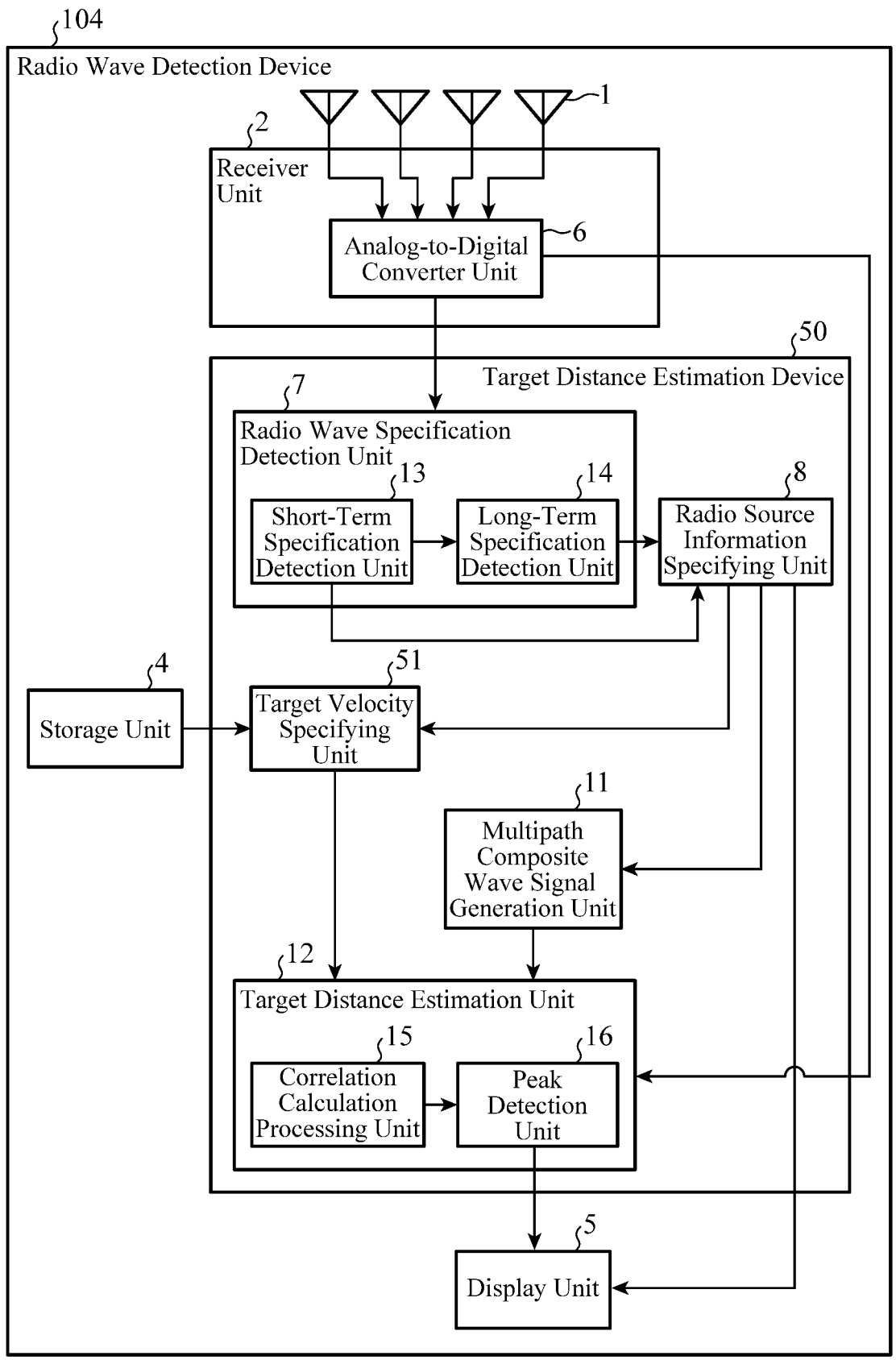
FIG. 9 is a block diagram illustrating a configuration of a radio wave detection device according to a third embodiment.

The third embodiment will be described below with reference to drawings. Note that the same reference numerals are given to components having a similar function as that described in the first embodiment, and description thereof will be omitted. FIG. 9 is a block diagram illustrating a configuration of a radio wave detection device 104 according to the third embodiment. As illustrated in FIG. 9, a target distance estimation device 50 of the radio wave detection device 104 has a similar configuration to that of the target distance estimation device 3 according to the first embodiment except that a target velocity specifying unit 51 is included instead of the crest value acquisition unit 10 and the target altitude specifying unit 9.

The target velocity specifying unit 51 specifies a target velocity which is the velocity of a radio source on the basis of radio source information specified by a radio source information specifying unit 8. More specifically, in the third embodiment, a storage unit 4 stores a radio source velocity information database, and the target velocity specifying unit 51 specifies a target velocity on the basis of the radio source information specified by the radio source information specifying unit 8 and the radio source velocity information database stored in the storage unit 4. The radio source velocity information database herein refers to, for example, information in which radio sources and velocities of the radio sources are associated with each other. The target velocity specifying unit 51 outputs the specified target velocity to a target distance estimation unit 12.

In the third embodiment, the configuration in which the target velocity specifying unit 51 specifies the target velocity on the basis of the radio source information and the radio source velocity information database as described above will be described, however, the configuration for specifying the target velocity is not limited to this configuration. For example, the target velocity specifying unit 51 may specify the target velocity that is the velocity of the radio source on the basis of a Doppler frequency of a reception signal. In this case, a radio wave specification detection unit 7 may detect the Doppler frequency as radio wave specifications of the reception signal.

A multipath composite wave signal generation unit 11 according to the third embodiment generates, in a case where a provisional target distance, a provisional crest value which is a provisional crest value, and a provisional target altitude, which is a provisional altitude of the radio source, are set, a multipath composite wave signal that is a simulation signal of a composite wave of a direct wave and multipath waves received by a reception antenna 20. The multipath composite wave signal generation unit 11 outputs the generated multipath composite wave signal to the target distance estimation unit 12.

A correlation calculation processing unit 15 of the target distance estimation unit 12 according to the third embodiment performs correlation calculation between reception signals converted into digital signals by an analog-to-digital converter unit 6 and the multipath composite wave signal generated by the multipath composite wave signal generation unit 11, thereby calculating a correlation value for each pair of a provisional target distance, a provisional crest value, and a provisional target altitude. The correlation calculation processing unit 15 performs the calculation processing on two reception signals having different observation times. The correlation calculation processing unit 15 outputs the calculated correlation values to the peak detection unit 16.

The peak detection unit 16 of the target distance estimation unit 12 according to the third embodiment extracts a provisional target distance corresponding to a correlation value equal to or greater than a threshold value from among correlation values calculated by the correlation calculation processing unit 15. The peak detection unit 16 performs the extraction processing on two reception signals having different observation times. Then, the peak detection unit 16 estimates the amount of change in the target distance between the observation times on the basis of the extracted provisional target distances for the respective observation times. In addition, the peak detection unit 16 calculates a target travel distance, which is a travel distance of the radio source, on the basis of the target velocity specified by the target velocity specifying unit 51 and the difference between the observation times. Note that examples of the difference between the observation times herein include a PRI or scan period of a radar, a period of communication using a TDMA scheme, or the like. In addition, the peak detection unit 16 extracts, as the target distance, a provisional target distance corresponding to the amount of change in the target distance having the smallest difference from the calculated target travel distance among the amounts of change in the target distance estimated.

Note that, similarly to the second embodiment, the target distance estimation unit 12 according to the third embodiment may limit the provisional target distance and the provisional target altitude to be set for calculating the correlation values to be within ranges of provisional target distances and provisional target altitudes with which incident angles of direct waves and multipath waves transmitted, to the array antenna 1, by the radio source, which is presumed to be positioned at the concerned provisional target distance and the provisional target altitude, fall within the coverage of the array antenna 1.

Figure 10:
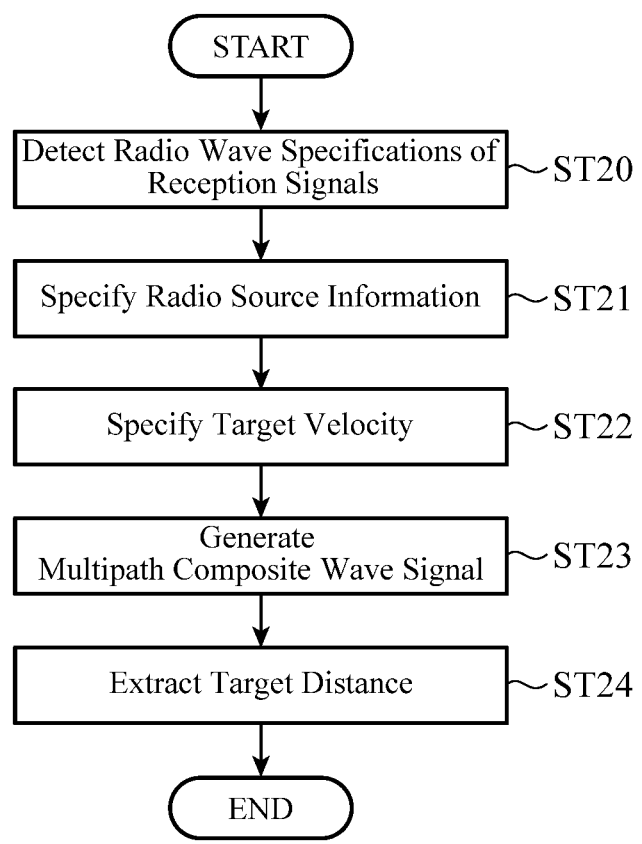
FIG. 10 is a flowchart illustrating a target distance estimation method by a target distance estimation device according to the third embodiment.

Hereinafter, the operation of the target distance estimation device 50 according to the third embodiment will be described with reference to drawings. FIG. 10 is a flowchart illustrating a target distance estimation method by the target distance estimation device 50 according to the third embodiment.

As illustrated in FIG. 10, the radio wave specification detection unit 7 detects radio wave specifications of the reception signals on the basis of the reception signals converted into digital signals by the analog-to-digital converter unit 6 (step ST20). The radio wave specification detection unit 7 outputs the detected radio wave specifications to the radio source information specifying unit 8.

Next, the radio source information specifying unit 8 specifies radio source information related to a radio source on the basis of the radio wave specifications detected by the radio wave specification detection unit 7 (step ST21). The radio source information specifying unit 8 outputs the specified radio source information to each of the target altitude specifying unit 9 and the display unit 5.

Next, the target velocity specifying unit 51 specifies a target velocity which is the velocity of the radio source on the basis of the radio source information specified by the radio source information specifying unit 8 (step ST22). The target velocity specifying unit 51 outputs the specified target velocity to a target distance estimation unit 12.

Next, the multipath composite wave signal generation unit 11 generates, in a case where a provisional target distance, a provisional crest value which is a provisional crest value, and a provisional target altitude, which is a provisional altitude of the radio source, are set, a multipath composite wave signal that is a simulation signal of a composite wave of a direct wave and multipath waves received by a reception antenna 20 (step ST23). The multipath composite wave signal generation unit 11 outputs the generated multipath composite wave signal to the target distance estimation unit 12.

Next, in step ST24, the target distance estimation unit 12 calculates a correlation value for each pair of a provisional target distance, a provisional crest value, and a provisional target altitude by performing correlation calculation between the reception signals and the multipath composite wave signal generated by the multipath composite wave signal generation unit 11 and performs processing of extracting a provisional target distance corresponding to a correlation value greater than or equal to a threshold value among the calculated correlation values for the two reception signals having different observation times. Furthermore, in step ST24, the target distance estimation unit 12 estimates the amount of change in the target distance between the observation times on the basis of the extracted provisional target distances for the respective observation times, calculates a target travel distance, which is a travel distance of the radio source, on the basis of the target velocity specified by the target velocity specifying unit 51 and the difference between the observation times, and extracts, as the target distance, a provisional target distance corresponding to the amount of change in the target distance having the smallest difference from the calculated target travel distance among the amounts of change in the estimated target distances. The target distance estimation unit 12 outputs the extracted target distance to the display unit 5. The display unit 5 displays the radio source information specified by the radio source information specifying unit 8 and the target distance extracted by the target distance estimation unit 12 in association with each other.

Hereinafter, a specific example of a target distance estimation method (step ST24 described above) by the target distance estimation device 50 according to the third embodiment will be described. Incidentally, in the following description, a character bracketed by [ ] indicates a vector indicated in bold in the following equations.

Figure 11:
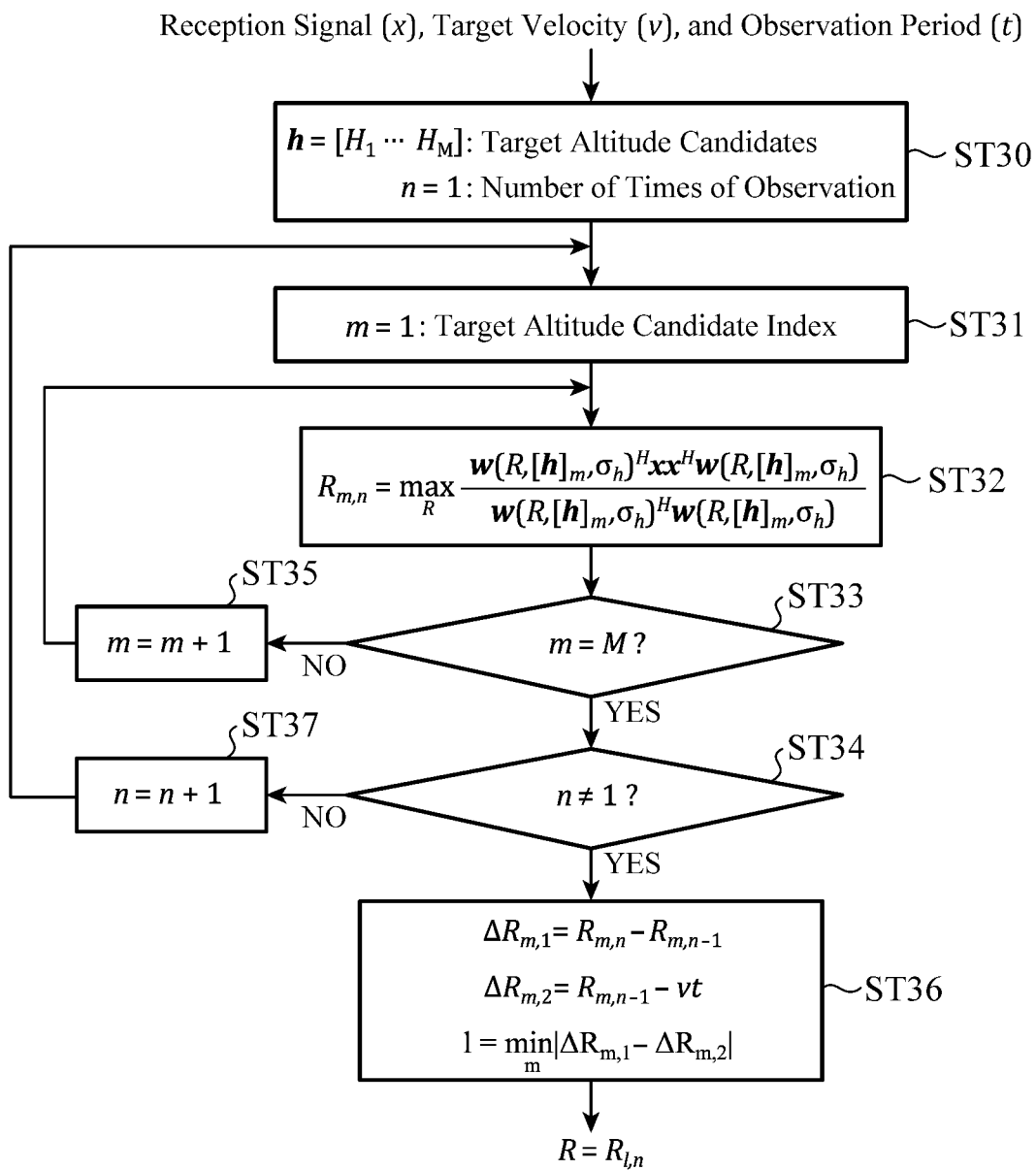
FIG. 11 is a processing flow for describing a specific example of the target distance estimation method by the target distance estimation device according to the third embodiment.

Even in a case where three-dimensional correlation calculation of the provisional target distance, the provisional crest value, and the provisional target altitude is performed with all the variables of Equation (23) described in the specific example of the first embodiment used as unknown parameters, since combinations of a provisional target distance, a crest value, and a target altitude, having the same or extremely close correlation values calculated for the combinations, may appear, there is a possibility that the target distance cannot be estimated correctly. Therefore, a processing flow described below is performed. FIG. 11 is a processing flow for describing a specific example of the target distance estimation method by the target distance estimation device 50 according to the third embodiment.

First, the target distance estimation unit 12 sets a target altitude candidate [h] and sets the number of observations n to 1 (step ST30).

Next, the target distance estimation unit 12 sets a target altitude candidate index m to 1 (step ST31).

Next, the target distance estimation unit 12 calculates a correlation value for each pair of a provisional target distance R, a provisional crest value $[h]_m$ (component m of a vector [h]), and a provisional target altitude $\sigma_h$ by performing correlation calculation between the reception signals [x] and the multipath composite wave signal [w] generated by the multipath composite wave signal generation unit 11 and extracts a provisional target distance $R_{m,n}$ corresponding to a correlation value equal to or greater than a threshold value among the calculated correlation values (step ST32).

Next, the target distance estimation unit 12 determines whether m=M holds (step ST33).

If it is determined that m=M (YES in step ST33), the target distance estimation unit 12 determines whether or not n≠1 holds (step ST34). If it is determined that m=M does not hold (NO in step ST33), the target distance estimation unit 12 adds 1 to m (step ST35) and executes the processing of step ST32 again.

If it is determined that n≠1 in step ST34, the target distance estimation unit 12 proceeds to processing of step ST36. If it is determined that n≠1 does not hold in step ST34, the target distance estimation unit 12 adds 1 to n.

In step ST36, the target distance estimation unit 12 calculates an amount of change $\Delta R_{m,1}$ of the target distance between observation times, which is a difference between an extracted provisional target distance $R_{m,n}$ at an observation time n and a provisional target distance $R_{m,n-1}$ at an observation time n-1, calculates a target travel distance $\Delta R_{m,2}$, which is a travel distance of the radio source, on the basis of a target velocity v specified by the target velocity specifying unit 51 and an observation period t, which is a difference between the observation times, and extracts, as the target distance, a provisional target distance $R_{1,n}$ (a provisional target distance in a case where the target altitude candidate index is 1) corresponding to an amount of change in the target distance having the smallest difference from the calculated target travel distance $\Delta R_{m,2}$ among the calculated amounts of change $\Delta R_{m,1}$ in the target distance.

Figure 12:
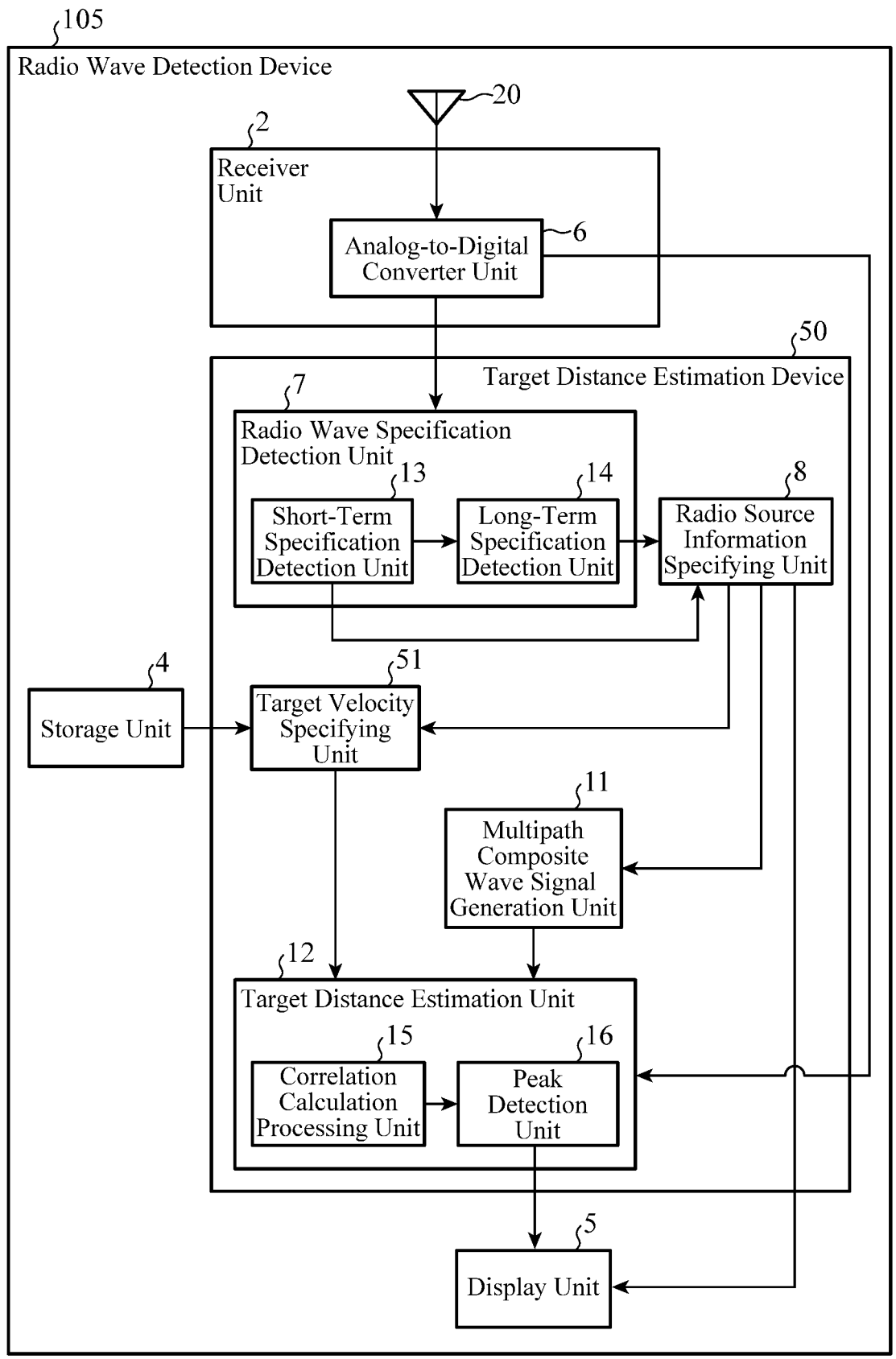
FIG. 12 is a block diagram illustrating a configuration of a radio wave detection device according to a modification of the third embodiment.

Hereinafter, a modification of the radio wave detection device 104 according to the third embodiment will be described with reference to drawings. FIG. 12 is a block diagram illustrating a configuration of the radio wave detection device 105 according to the modification of the third embodiment. As illustrated in FIG. 12, the radio wave detection device 105 has a similar configuration to that of the radio wave detection device 104 except that a reception antenna 20 (already described in the modification of the first embodiment) is included instead of the array antenna 1.

The operation of a target distance estimation device 50 according to the modification is similar to the specific example of the multipath composite wave signal generating method and the target distance estimation method by the target distance estimation device 3 according to the first embodiment except that the target distance estimation unit 12 accumulates data as in the above Equation (26) and performs the three-dimensional correlation calculation of provisional target distances, provisional target altitudes, and provisional crest values on the basis of the above Equations (27) and (28) and that processing of steps ST30 to ST36 is performed.

Note that the functions of the radio wave specification detection unit 7 (the short-term specification detection unit 13 and the long-term specification detection unit 14), the radio source information specifying unit 8, the target velocity specifying unit 51, the multipath composite wave signal generation unit 11, and the target distance estimation unit 12 (the correlation calculation processing unit 15 and the peak detection unit 16) in the target distance estimation device 50 according to the third embodiment are implemented by a processing circuitry. That is, the target distance estimation device 50 according to the third embodiment includes a processing circuitry for executing the processing of the steps illustrated in FIG. 10 or 11. The processing circuitry may be dedicated hardware or a central processing unit (CPU) for executing a program stored in a memory. A hardware configuration for implementing the functions of the target distance estimation device 50 according to the third embodiment is similar to the hardware configuration illustrated in FIG. 4A. In addition, a hardware configuration for executing software for implementing the functions of the target distance estimation device 50 according to the third embodiment is similar to the hardware configuration illustrated in FIG. 4B.

As described above, the target distance estimation device 50 according to the third embodiment further includes: the radio wave specification detection unit 7 to detect radio wave specifications of the reception signals on the basis of the reception signals; the radio source information specifying unit 8 to specify radio source information related to the radio source on the basis of the radio wave specifications detected by the radio wave specification detection unit 7; and the target velocity specifying unit 51 to specify the target velocity, which is the velocity of the radio source, on the basis of the radio source information specified by the radio source information specifying unit 8, in which the multipath composite wave signal generation unit 11 generates the multipath composite wave signal that is the simulation signal of the composite wave of the direct wave and the multipath wave received by the array antenna 1 (reception antenna) in a case where a provisional target distance and a provisional crest value, which is a provisional crest value, and a provisional target altitude, which is a provisional altitude of the radio source, are set, and the target distance estimation unit 12 calculates a correlation value for each pair of a provisional target distance, a provisional crest value, and a provisional target altitude by performing correlation calculation between the reception signals and the multipath composite wave signal generated by the multipath composite wave signal generation unit 11, performs processing of extracting a provisional target distance corresponding to a correlation value greater than or equal to a threshold value among the calculated correlation values for the two reception signals having different observation times, estimates the amount of change in the target distance between the observation times on the basis of the extracted provisional target distances for the respective observation times, calculates a target travel distance, which is a travel distance of the radio source, on the basis of the target velocity specified by the target velocity specifying unit 51 and the difference between the observation times, and extracts, as the target distance, a provisional target distance corresponding to the amount of change in the target distance having the smallest difference from the calculated target travel distance among the amounts of change in the estimated target distances.

According to the above configuration, a provisional target distance corresponding to the amount of change in the target distance having the smallest difference from the target travel distance based on the specified target velocity among the amounts of change in the target distance estimated is extracted as the target distance. As a result, even in a situation where no target altitude and no crest value are determined, it is possible to estimate the target distance from the radio wave detection device 104 to the radio source.

For example, in a case where the platform of the radio source is an aircraft, for an aircraft, it is aerodynamically difficult to freely change the velocity even though the altitude can be freely changed. Therefore, the velocity of an aircraft is information that is more easily obtained than the altitude of the aircraft. Therefore, according to the above configuration of the target distance estimation device 50 according to the third embodiment, it is possible to implement ranging with respect to a target for which altitude information cannot be obtained.

The target velocity specifying unit 51 in the target distance estimation device 50 according to the third embodiment may specify the target velocity that is the velocity of the radio source on the basis of a Doppler frequency of a reception signal.

According to the above configuration, even in a case where the target velocity cannot be specified on the basis of the radio source information, the target velocity can be specified on the basis of the Doppler frequency of the reception signal. Furthermore, by extracting a provisional target distance corresponding to the amount of change in the target distance having the smallest difference from the target travel distance based on the specified target velocity among the amounts of change in the estimated target distance as the target distance, the target distance from the radio wave detection device 104 to the radio source can be estimated even in a situation where neither the target altitude or the crest value is determined.

Note that it is possible include a flexible combination of the embodiments, a modification of any component of the embodiments, or omission of any component in the embodiments.

INDUSTRIAL APPLICABILITY

A target distance estimation device according to the present disclosure can improve estimation accuracy of a target distance from a radio wave detection device to a radio source and thus is applicable to the radio wave detection device.

REFERENCE SIGNS LIST

1: Array antenna, 2: Receiver unit, 3, 40, and 50: Target distance estimation device, 4: Storage unit, 5: Display unit, 6: Analog-to-digital converter unit, 7: Radio wave specification detection unit, 8: Radio source information specifying unit, 9: Target altitude specifying unit, 10: Crest value acquisition unit, 11: Multipath composite wave signal generation unit, 12: Target distance estimation unit, 13: Short-term specification detection unit, 14: Long-term specification detection unit, 15: Correlation calculation processing unit, 16: Peak detection unit, 20: Reception antenna, 30: Processing circuitry, 31: Processor, 32: Memory, 51: Target velocity specifying unit, 100, 101, 102, 103, 104, and 105: Radio wave detection device

What is claimed is:

1. A target distance estimation device to estimate a target distance from a radio wave detection device to a radio source on a basis of reception signals obtained by a reception antenna of the radio wave detection device receiving a direct wave and a multipath wave from the radio source, the target distance estimation device comprising:
   processing circuitry
   to generate a multipath composite wave signal that is a simulation signal of a composite wave of the direct wave and the multipath wave received by the reception antenna in a case where a provisional target distance, which is a provisional target distance from the radio wave detection device to the radio source, is set, and to estimate the target distance from the radio wave detection device to the radio source on a basis of a correlation between the reception signals and the generated multipath composite wave signal, wherein the processing circuitry:
- detects radio wave specifications of the reception signals on a basis of the reception signals,
- specifies radio source information related to the radio source on a basis of the detected radio wave specifications,
- specifies a target altitude that is an altitude of the radio source on a basis of the specified radio source information, and
- generates the multipath composite wave signal on a basis of the specified target altitude.

2. The target distance estimation device according to claim 1, wherein
the processing circuitry acquires a crest value,
generates the multipath composite wave signal on a basis of the acquired crest value.

3. The target distance estimation device according to claim 1, wherein
the processing circuitry
acquires a crest value,
generates the multipath composite wave signal on a basis of the specified target altitude and the acquired crest value, and
calculates a correlation value for each of the provisional target distance by performing correlation calculation between the reception signals and the generated multipath composite wave signal and extracts, as the target distance, a provisional target distance corresponding to a largest correlation value among the correlation values that have been calculated.

4. The target distance estimation device according to claim 1, wherein
the processing circuitry
generates the multipath composite wave signal that is the simulation signal of the composite wave of the direct wave and the multipath wave received by the reception antenna in a case where the provisional target distance and a provisional crest value, which is a provisional crest value, are set on a basis of the specified target altitude, and
calculates a correlation value for each pair of the provisional target distance and the provisional crest value by performing correlation calculation between the reception signals and the generated multipath composite wave signal and extracts, as the target distance, a provisional target distance corresponding to a largest correlation value among the correlation values that have been calculated.

5. The target distance estimation device according to claim 1, wherein
the processing circuitry
specifies a target velocity, which is a velocity of the radio source, on a basis of the specified radio source information,
generates the multipath composite wave signal that is the simulation signal of the composite wave of the direct wave and the multipath wave received by the reception antenna in a case where the provisional target distance, a provisional crest value, which is a provisional crest value, and a provisional target altitude, which is a provisional altitude of the radio source, are set, and
calculates a correlation value for each pair of the provisional target distance, the provisional crest value, and the provisional target altitude by performing correlation calculation between the reception signals and the generated multipath composite wave signal, performs processing of extracting a provisional target distance corresponding to a correlation value greater than or equal to a threshold value among the calculated correlation values for two reception signals having different observation times, estimates an amount of change in the target distance between the observation times on a basis of the extracted provisional target distances for the respective observation times, calculates a target travel distance, which is a travel distance of the radio source, on a basis of the specified target velocity and the difference between the observation times, and extracts, as the target distance, a provisional target distance corresponding to the amount of change in the target distance having the smallest difference from the calculated target travel distance among the amounts of change in the estimated target distances.

6. The target distance estimation device according to claim 1, wherein
the processing circuitry specifies a target velocity, which is a velocity of the radio source, on a basis of a doppler frequency of the reception signals,
generates a multipath composite wave signal that is the simulation signal of the composite wave of the direct wave and the multipath wave received by the reception antenna in a case where the provisional target distance, a provisional crest value, which is a provisional crest value, and a provisional target altitude, which is a provisional altitude of the radio source, are set, and
calculates a correlation value for each pair of the provisional target distance, the provisional crest value, and the provisional target altitude by performing correlation calculation between the reception signals and the generated multipath composite wave signal, performs processing of extracting a provisional target distance corresponding to a correlation value greater than or equal to a threshold value among the calculated correlation values for two reception signals having different observation times, estimates an amount of change in the target distance between the observation times on a basis of the extracted provisional target distances for the respective observation times, calculates a target travel distance, which is a travel distance of the radio source, on a basis of the specified target velocity and the difference between the observation times, and extracts, as the target distance, a provisional target distance corresponding to the amount of change in the target distance having the smallest difference from the calculated target travel distance among the amounts of change in the estimated target distances.

7. The target distance estimation device according to claim 4, wherein the processing circuitry limits the provisional target distance and the provisional target altitude to be set for calculating the correlation values to be within ranges of provisional target distances and provisional target altitudes with which incident angles of the direct wave and the multipath wave transmitted, to the reception antenna, by the radio source, which is presumed to be positioned at the provisional target distance and the provisional target altitude, fall within a coverage of the reception antenna.

8. The target distance estimation device according to claim 5, wherein the processing circuitry limits the provisional target distance and the provisional target altitude to be set for calculating the correlation values to be within ranges of provisional target distances and provisional target altitudes with which incident angles of the direct wave and the multipath wave transmitted, to the reception antenna, by the radio source, which is presumed to be positioned at the provisional target distance and the provisional target altitude, fall within a coverage of the reception antenna.

9. The target distance estimation device according to claim 6, wherein the processing circuitry limits the provisional target distance and the provisional target altitude to be set for calculating the correlation values to be within ranges of provisional target distances and provisional target altitudes with which incident angles of the direct wave and the multipath wave transmitted, to the reception antenna, by the radio source, which is presumed to be positioned at the provisional target distance and the provisional target altitude, fall within a coverage of the reception antenna.

10. The target distance estimation device according to claim 1, wherein
the reception antenna is an array antenna and acquires reception signals for each of antenna elements by receiving the direct wave and the multipath wave from the radio source by the antenna element,
the processing circuitry detects the radio wave specifications on a basis of the reception signals for each of the antenna elements, and
specifies the radio source information on a basis of the detected radio wave specifications on a basis of the reception signals for each of the antenna elements.

11. The target distance estimation device according to claim 1, wherein the processing circuitry accumulates the estimated target distances and smooths a plurality of the accumulated target distances using a filter.

12. The target distance estimation device according to claim 1, wherein
the processing circuitry specifies, at least, effective radiated power of the radio source as the radio source information on a basis of the detected radio wave specifications, and
calculates an estimated target distance range from the radio wave detection device to the radio source on a basis of reception power of the reception signals and the specified effective radiated power and exclude a target distance outside the estimated target distance range, which has been calculated, from the estimated target distances.

13. The target distance estimation device according to claim 1, wherein
the reception antenna acquires reception signals for each of a plurality of radio sources included in a single platform by receiving a direct wave and a multipath wave from each of the radio sources,
the processing circuitry generates the multipath composite wave signal for each of the radio sources, and
estimates the target distance for each of the radio sources on a basis of a correlation between the reception signals for each of the radio sources and the generated multipath composite wave signal for each of the radio sources and calculates an average value of the estimated target distances.

14. A radio wave detection device comprising:
the target distance estimation device according to claim 1;
the reception antenna; and
a display device to display the estimated target distance.

15. A target distance estimation method of estimating a target distance from a radio wave detection device to a radio source on a basis of reception signals obtained by a reception antenna of the radio wave detection device receiving a direct wave and a multipath wave from the radio source, the target distance estimation method comprising:
generating a multipath composite wave signal that is a simulation signal of a composite wave of the direct wave and the multipath wave received by the reception antenna in a case where a provisional target distance, which is a provisional target distance from the radio wave detection device to the radio source, is set, and
estimating the target distance from the radio wave detection device to the radio source on a basis of a correlation between the reception signals and the generated multipath composite wave signal, wherein
the target distance estimation method further comprises:
detecting radio wave specifications of the reception signals on a basis of the reception signals,
specifying radio source information related to the radio source on a basis of the detected radio wave specifications,
specifying a target altitude that is an altitude of the radio source on a basis of the specified radio source information, and
generating the multipath composite wave signal on a basis of the specified target altitude.

* * * * *